US006934862B2

(12) United States Patent
Sharood et al.

(10) Patent No.: US 6,934,862 B2
(45) Date of Patent: Aug. 23, 2005

(54) APPLIANCE RETROFIT MONITORING DEVICE WITH A MEMORY STORING AN ELECTRONIC SIGNATURE

(75) Inventors: John N. Sharood, Richmond, VA (US); Graham Bailey, Speyer (DE); D. Mitchell Carr, Potomac Falls, VA (US); James Turner, Richmond, VA (US); David Peachey, Mesa, AZ (US)

(73) Assignee: Robertshaw Controls Company, Richmond, VA (US)

( * ) Notice: Subject to any disclaimer, the term of this patent is extended or adjusted under 35 U.S.C. 154(b) by 674 days.

(21) Appl. No.: 09/755,203

(22) Filed: Jan. 8, 2001

(65) Prior Publication Data

US 2001/0025349 A1 Sep. 27, 2001

Related U.S. Application Data

(60) Provisional application No. 60/174,829, filed on Jan. 7, 2000, provisional application No. 60/176,005, filed on Jan. 14, 2000, and provisional application No. 60/180,281, filed on Feb. 4, 2000.

(51) Int. Cl.[7] .............................. G06F 1/26; G06F 1/32
(52) U.S. Cl. ...................................... 713/300; 713/340
(58) Field of Search ................................ 713/300, 340; 340/310.06, 310.01

(56) References Cited

U.S. PATENT DOCUMENTS

| | | | | | |
|---|---|---|---|---|---|
| 4,174,517 A | * | 11/1979 | Mandel | .................. | 340/310.02 |
| 4,644,320 A | * | 2/1987 | Carr et al. | ............. | 340/310.06 |
| 4,808,841 A | * | 2/1989 | Ito et al. | ........................ | 307/11 |
| 5,233,342 A | * | 8/1993 | Yashiro et al. | ............... | 340/3.7 |
| 5,424,587 A | * | 6/1995 | Federowicz | .................. | 307/140 |
| 5,650,771 A | * | 7/1997 | Lee | ............................. | 340/656 |
| 5,875,430 A | * | 2/1999 | Koether | .......................... | 705/1 |
| 5,880,677 A | * | 3/1999 | Lestician | ..................... | 340/3.1 |
| 6,380,852 B1 | * | 4/2002 | Hartman et al. | ............. | 340/521 |
| 6,668,328 B1 | * | 12/2003 | Bell | ............................. | 713/300 |

FOREIGN PATENT DOCUMENTS

| | | | | |
|---|---|---|---|---|
| DE | 196 54 837 A 1 | | 6/1998 | ............ H04B/3/54 |
| EP | 0 814 393 A1 | | 12/1997 | ......... G05B/19/042 |
| JP | 05-022773 | * | 1/1993 | |
| WO | WO 9607289 A1 | | 3/1996 | ............ H04Q/9/00 |
| WO | 99/43068 | * | 8/1999 | |
| WO | WO 01/15300 | | 3/2001 | |

OTHER PUBLICATIONS

George W. Hart, "Residential Energy Monitoring and Computerized Surveillance via Utility Power Flows" IEEE Technology and Society Magazine, Jun. 1989, pp 12–16.*

* cited by examiner

*Primary Examiner*—Chun Cao
(74) *Attorney, Agent, or Firm*—Fish & Richardson P.C.

(57) ABSTRACT

A device monitors an appliance that receives power from a source. The device includes a first coupler that couples the device to the power source. A second coupler couples the device to the appliance. A monitoring circuit is connected to the first coupler and the second coupler to monitor power supplied by the source to the appliance. A communications circuit also is provided. The monitoring circuit provides data based on the monitored power to the communications circuit for output to the first coupler. The communications circuit may include a receiver that receives a signal from the first coupler to control the monitoring circuit. The communications circuit also may include a transceiver that receives a signal from the first coupler to control the monitoring circuit and to transmit monitored power data.

35 Claims, 32 Drawing Sheets

APPLIANCE RETROFIT MONITORING DEVICE WITH A MEMORY STORING AN ELECTRONIC SIGNATURE

This application claims priority from U.S. Provisional Application No. 60/174,829, filed Jan. 7, 2000; 60/176,005, filed Jan. 14, 2000; and 60/180,281, filed Feb. 4, 2000, the entire disclosures of which are incorporated by reference.

TECHNICAL FIELD

This invention relates generally to building automation, and more particularly to a retrofit monitoring device for use in building automation.

BACKGROUND

Building automation concepts have been known for some time. However, in general, these concepts have been limited to large industrial settings or to custom-designed systems for luxury homes because of the prohibitive cost associated with conventional automation systems. In addition, automation systems generally have been placed in new structures because of the substantial wiring necessary to implement these systems. Retrofitting automation systems in existing structures has been unpopular because, in general, the procedure is invasive and may require destruction of interior surfaces, substantial rewiring, significant expense, and inconvenience to the homeowner or tenant.

SUMMARY

In one general aspect, a complete home and commercial automation system may accommodate existing appliances at a cost that is affordable to the average homeowner or small business. In addition, the automation system can be installed in a home or a building without substantial rewiring, expense, or invasiveness. The automation system allows control of all associated systems from a remote location using virtual controls that resemble the actual controls of the appliances. In addition, the virtual controls have a consistent appearance between most interfaces. As a result, a user can operate and monitor systems without having to be present on site and without having to learn how to operate new controls. The automation system also can monitor the use of all home appliances and provide this information to a monitoring facility or a service provider. As a result, the monitoring facility or the service provider can provide services to the user at a time when the service would be most beneficial to the user. In addition, by monitoring specific use of home appliances and user activities, companies can offer the user better service through the use of interactive coupons, warranties, improved maintenance, repair information, and interactive messaging.

In one general aspect, a device monitors an appliance that receives power from a source. The device includes a first coupler that couples the device to the power source. A second coupler couples the device to the appliance. A monitoring circuit is connected between the first coupler and the second coupler to monitor power supplied by the source to the appliance. A communications circuit also is provided. The monitoring circuit provides data based on the monitored power to the communications circuit, and the communications circuit outputs these data through the first coupler.

The communications circuit may include a receiver that receives a signal from the first coupler to control the monitoring circuit. The communications circuit also may include a transceiver that receives a signal from the first coupler to control the monitoring circuit and to transmit monitored power data. For example, the communications circuit may include a power line carrier transceiver and a power line driver.

The monitoring circuit may measures current drawn by the appliance, and may include a processor that determines an operating state of the appliance based on the measured current. The monitoring circuit also may include a memory for storing the measured current and periodically sending measured current data to the first coupler. The memory may store an electronic signature, and the processor may determine an operating state of the appliance based on the electronic signature.

A modem may be connected to the monitoring circuit and may transmit data based on the measured current. A radio frequency transmitter also may be connected to the monitoring circuit for transmitting data based on the measured current. A serial port connected to the monitoring circuit may be used to receive data about the appliance.

A battery may be included to supply power to the monitoring circuit when power is not received by the first coupler.

A switch may be connected to the first coupler. The switch can be opened in response to the control signal. When opened, power from the source may be inhibited from being supplied to the appliance.

The first coupler may include a pin for connection to a live line and a pin for connection to a neutral line. First and second power lines may connect the first and second couplers. The second coupler may include a first slot connected to the live pin through the first power line and a neutral slot connected to the second pin through the second power line.

In another general aspect, a system for monitoring an appliance that receives power from a source may include a power line connected to the source, a circuit connected to the power line and the appliance, a circuit that monitors power supplied to the appliance, and a processor connected to the power line. The circuit sends signals to the processor through the power line. The signals are based on the power supplied to the appliance.

The circuit may include a first coupler coupling the circuit to the power line, a second coupler coupling the circuit to the appliance, a monitoring circuit connected between the first coupler and the second coupler to monitor power supplied by the source to the appliance, and a communications circuit connected to the monitoring circuit. The monitoring circuit may provide data based on the monitored power to the communications circuit.

The circuit may be a plug having a live pin and a neutral pin and slots for receiving a live pin and a neutral pin from the appliance's plug. The live pin connects to a live line and the neutral pin connects to a neutral line.

The system may include a connection to a service provider that monitors the appliance. The processor may be a control server that sends signals to the service provider about the operation of the appliance. The processor also may be a gateway.

The processor may diagnose the signals to determine if an appliance needs servicing. The system may include a display. The processor may send a message to the display alerting a user when the appliance needs servicing.

In another general aspect, a retrofit plug is adapted to be that receives by an appliance receiving power from a source. The retrofit plug includes a live pin, a neutral pin, a first line connected to the live pin, and a second line connected to the neutral pin. A fist slot is connected the first line for receiving a live pin connected to the appliance. A second slot is connected to the second line for receiving a neutral pin connected to the appliance. A transformer monitors the first and second lines. A measurement circuit connected to the transformer measures current supplied to the appliance. A power line carrier transceiver encodes a power line carrier signal based on the measured current.

Other features and advantages will be apparent from the description, the drawings, and the claims.

DESCRIPTION OF DRAWINGS

Like reference symbols in the various drawings indicate like elements

DETAILED DESCRIPTION

System Overview

An automation system, which may also be referred to as a building control (BC) system, may be used to automate a home, an office, or another type of commercial or residential building. In the residential context, the BC system establishes a home network that controls, coordinates, facilitates, and monitors user-designated activities within the home. The BC system provides compatibility between external and internal networks, systems, and appliances, and is modular in construction to allow easy expansion and customization. The BC system can be retrofitted for use in existing structures and legacy appliances without the need for drastic remodeling, added wiring, or complicated installation/customization, and can be installed by a homeowner with minimal instruction. Professional installation and maintenance also are simplified, so as to avoid the high costs typically associated with custom home automation.

The modularity of the BC system provides for easy customization for either commercial or residential use. For residential applications, system elements may be sealed for easy installation, configuration, and aesthetic appearance. Expansion within the residential applications can be accomplished by adding new modules to the system. On the other hand, for commercial or advanced residential applications, the system can be custom configured and expanded through the additional use of expansion boards, PCMCIA cards, or plug in solutions. Although the following examples are primarily described with reference to home applications, the described devices and concepts also are applicable for commercial use.

The BC System

Figure 1:
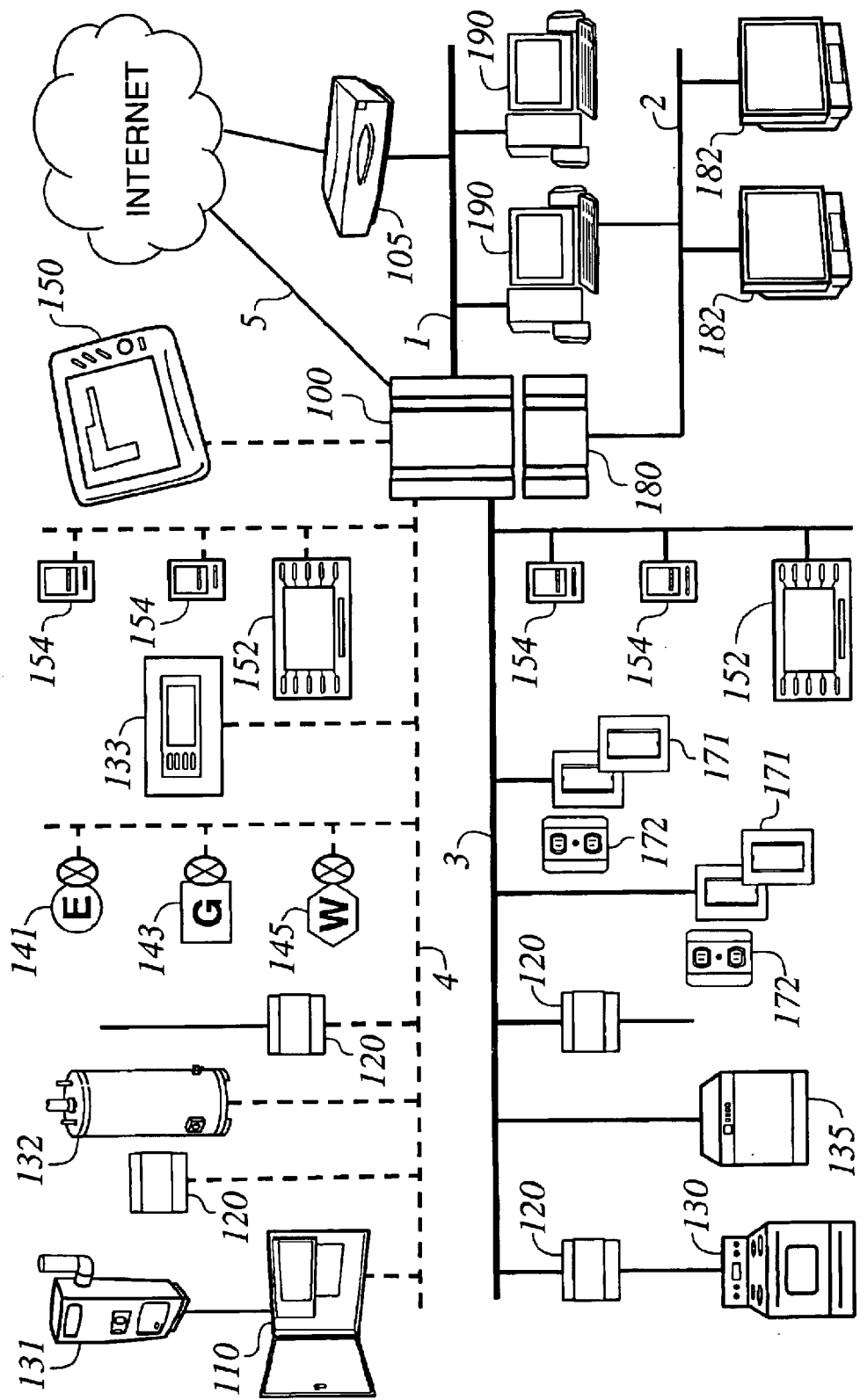
FIG. 1 is a block diagram of an exemplary automation system.

Referring to FIG. 1, an exemplary BC system is based around a control server 100 that manages a number of primary networks including: an internal home network 1 (e.g., a USB or Ethernet network), a video distribution network 2 (e.g., Peracom AvCast System), a power line carrier (PLC) network 3, a wireless radio frequency (RF) communications network 4, and an Internet portal 5 (e.g., a DSL modem). BC system devices attach to the control server 100 through one of these networks, and each network services a different aspect of home automation.

The home network 1 can include a residential broadband gateway 105 for high-speed interaction with the Internet and service providers. In addition, a number of computer systems 190 can be connected to provide access to the control server 100 and between the computer systems 190. The home network 1 can be implemented using any LAN system, such as, for example, an Ethernet system. The computer system 190 can be used as an interface for controlling home automation and running home automation software.

The video distribution network 2 can include an AvCast subcomponent 180 that plugs into the control server 100 to coordinate multimedia activity between, for example, video monitors 182 and a satellite TV system 181. The video distribution system 2 also can act as an interface to the control server 100.

The PLC network 3 provides control of switches 171, power outlets 172, and smart appliances 135. In addition, a number of communications modules 120 can be used to communicate with legacy devices, such as a range 130. Retrofit plugs 125 also can be used within the PLC network to provide communication with legacy devices. A number of different interfaces, such as, for example, touch pads 152, 154 and portable tablet 150, can be used to provide for user interaction with the control server.

The RF network 4 includes communications modules 120, legacy appliances 132, and interfaces 152 and 154. In addition, a universal controller 110 can be used to control appliances, such as a furnace 131. The RF network 4 can be connected with sensors 141, 143, and 145 to monitor home utilities such as electricity, gas, and water, respectively. A smart thermostat 133 and a damper system can be used to control and optimize home heating and cooling.

The Internet portal 5 allows access and control of the BC system from a remote location. In addition, service providers may remotely monitor appliances, usage, and security within the home. New applications and upgrades of existing software can be obtained through the Internet.

BC Controller/Server

The control server 100 is the core of the BC system. The control server 100 provides multi-protocol routing and supervisory control for communicating appliances and general purpose device controllers. The control server 100 is responsible for communicating with subordinate system devices while making data available to other supervising devices. The supervising devices include local user interfaces or Internet-based remote interfaces.

The control server 100 features pre-configured control function blocks or objects, in addition to user defined control strategies, that run on a real time control engine capable of executing combinational and sequential logic control. The control engine may be application specific or generic depending on the size and the intended purpose of the BC system in which the control engine is implemented. The control function blocks executed by the control server 100 are designed to operate in a number of modes, such as, for example, an away mode, a sleep mode, and a vacation mode, among others. The control server 100 operates appliances and subsystems based on the BC system's current operating mode. For example, when entering the away mode, the control server 100 can activate the security system and turn down the heat or the air conditioning. In addition to modes that can be selected and transitioned, "hard-wired" functions are provided to initiate actions based on recognition of certain external conditions. One example of such an action is the flashing of red screens on all televisions and displays in a home when a fire alarm is tripped.

The control server 100 also provides for protocol conversion. For example, if an attached appliance has a stripped-down protocol, the control server 100 adds the missing elements to make the appliance appear to be compliant with a desired industry standard protocol. Where the physical layer necessary for communication with a device is not available in the control server 100, add-on units may be used to attach the control server to the device. The control server 100 accommodates multiple protocols and physical layers through communications modules 120 attached between devices using foreign protocols or physical layers and the control server 100. Similarly, smart modules, retrofit plugs, and universal controllers may be used to provide the function of protocol conversion. The control server 100 interfaces with any of the system graphic user interfaces (GUIs), PC networks, Internet, and all other portions of the BC system as described in greater detail below.

Figure 2:
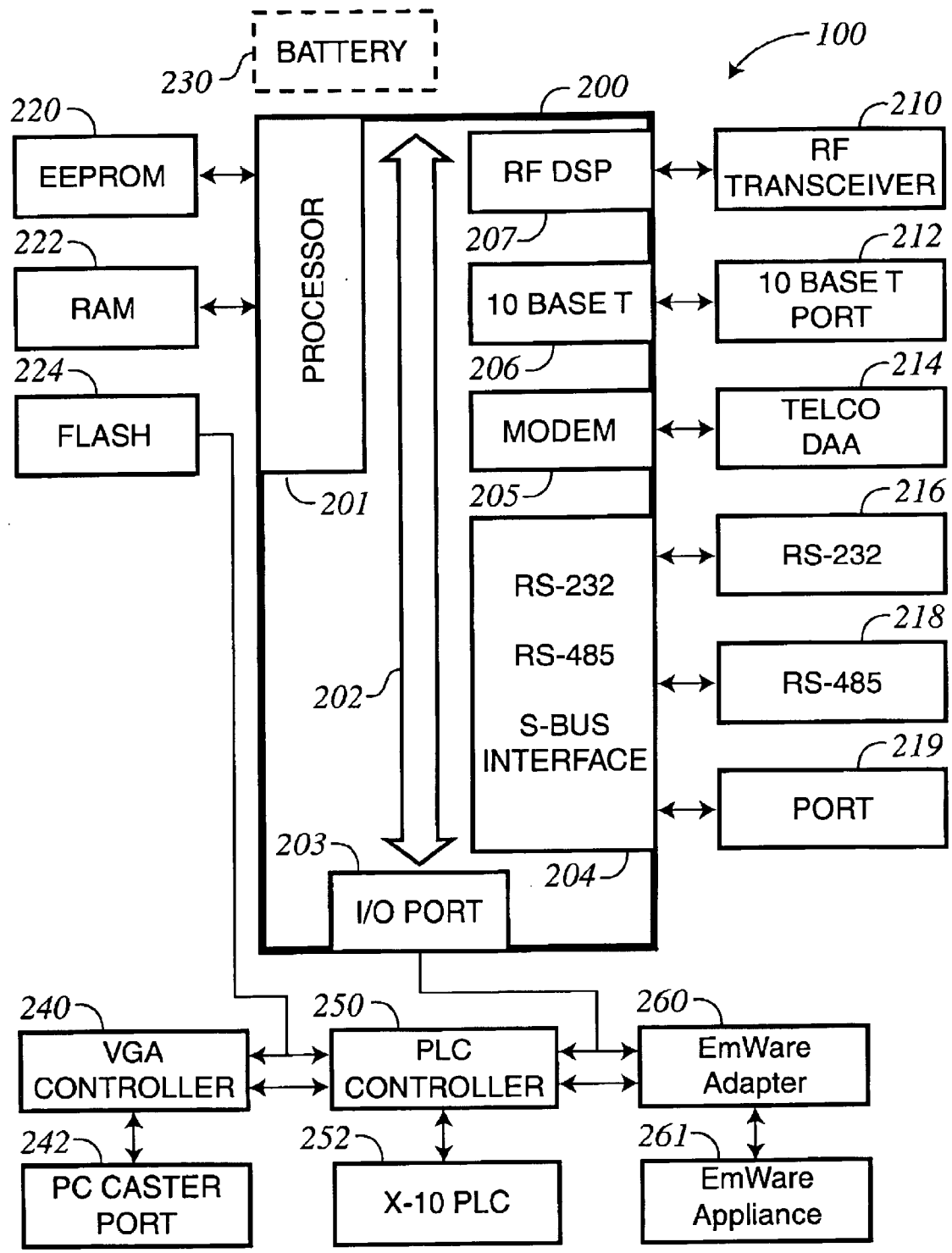
FIGS. 2 and 3 are block diagrams of a control server of the system of FIG. 1.

The control server 100 is modular in design and can be scaled with regard to size, functions, and hardware desired for a specific implementation. One example of a control server 100 is shown in FIG. 2. As shown in FIG. 2, the control server 100 includes a processor 200. The processor 200 is connected to a board with a communications bus 202, an I/O port 203, and interfaces including a RF digital signal processor 207, a 10 BASE-T interface 206, a modem 205, and a serial interface 204. The interfaces provide communication between the control server 100 and the primary BC system networks 1–5.

The processor 200 also is connected to a flash memory 224, a RAM 222, and an EEPROM 220. An optional power source (RTC xtal and Battery) 230 can be used to power the control server 100 in the event of loss of power. A number of communication ports are connected with the various interfaces. The communication ports can include a 10 BASE-T port 212, a TELCO DAA 214, a RS-232 port 216, a RS-485 port 218, and a S-BUS port (or USB port) 219.

In addition, a PLC controller 280 and an EmWare Adapter 260 are connected to the communications input/output port 203. These devices may be configured on the board or as add-on modules. The EmWare adapter 260 can be used to communicate with and control appliances or systems that use an EmWare communications protocol. Other adapters for other communications protocol or systems can be provided in an original device or as add-on, plug-in applications. A VGA controller 240 is provided for connection with a PC caster port 242.

Figure 3:
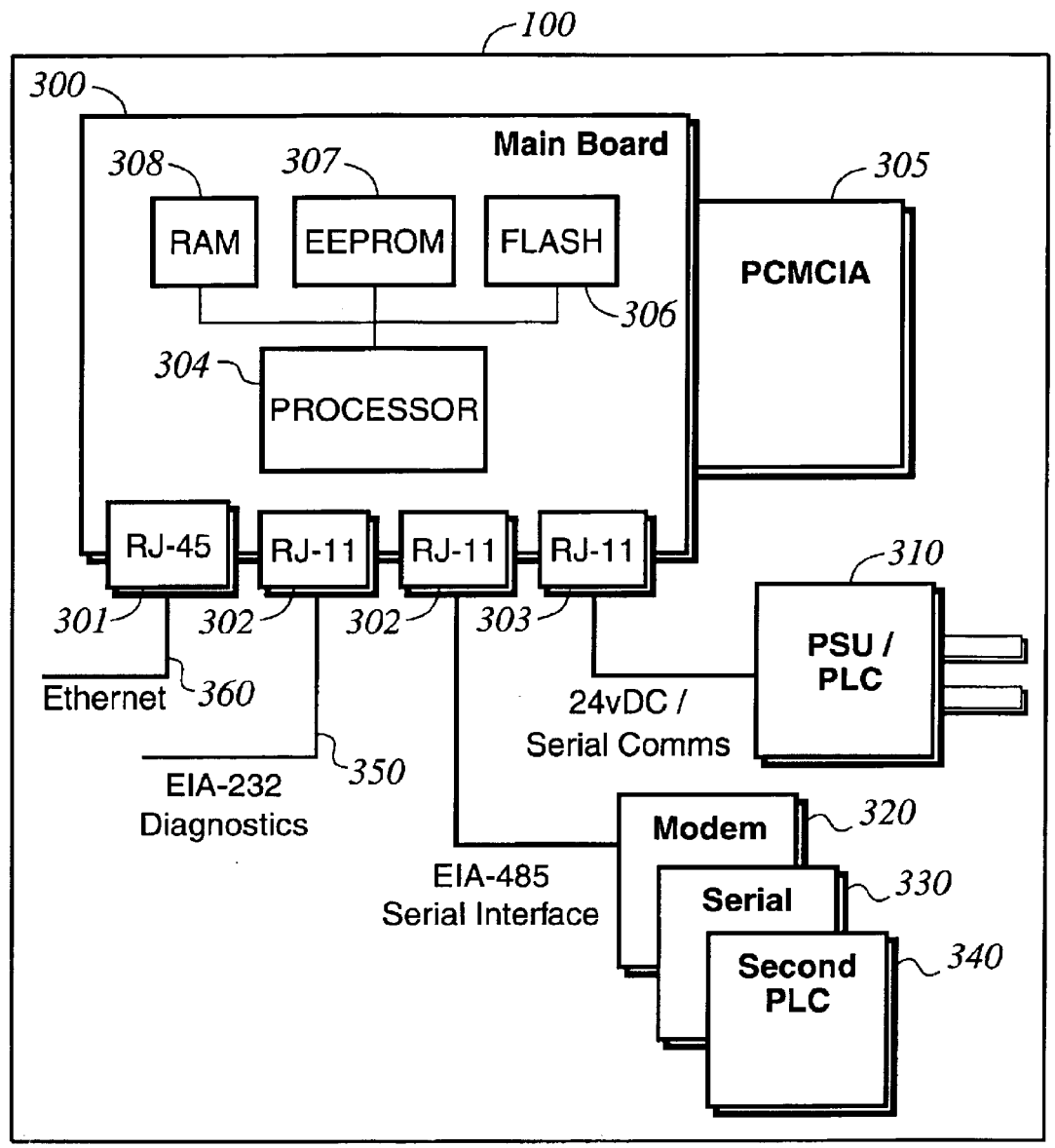

As shown in FIG. 3, the control server 100 also can be implemented as a main board 300 with optional add on boards and PCMCIA slots. The main board 300 includes an Ethernet connection 301, a serial I/O port 315, and an optional slot for a PC card 305. Daughter boards are connected to the main board using a system bus connector. A daughter board typically includes an eight-way serial interface card and a four-way Ethernet card, with an optional slot for a PC card. The main board 300 can be implemented using a Motorola MPC860 PowerPC core 304, a memory (including flash 306, DRAM 308, NVRAM 307), and I/O including: Dual SCC channels with HDLC interface, two status LEDs, two Tx/Rx pair communication status LED indicators, a debug RS-232 serial port, a PCMCIA slot, 10/100 Base T physical interface connector, an EIA-232 serial port, an EIA-485 serial port, and an EIA-485 serial port with 24V PSU input.

External connections from the main board 300 include a single RJ-45 connector 301 for an Ethernet connection and a number of RJ-11 connectors for serial communications. The first RJ-11 connector 303 can support two connections for 24V DC serial communication for PLC 310 and a second connector 302 for an EIA-485 serial interface. The serial interfaces on the main board 300 can use RJ-11 connectors. PLC interfaces to the main board, as well as other boards, are made through a serial interface to, for example, external communications modules. The primary PLC interface 310 is enclosed inside the external transformer housing that provides 24V DC to the control server.

Functionally, the Ethernet interface 360 to the main board 300 is the primary WAN or broadband interface. Typically, the interface 360 can be connected to a cable modem or a DSL modem and can provide a firewall to secure data access. The EIA-232 interface 350 is provided for programming and debugging of the control server 100 in the field. The free EIA-485 interface allows flexible customization of the control server 100 or connection to an external POTS modem, a serial interface (third party device), or a second PLC.

The control server 100 main board 300 can accommodate a number of additional EIA-485 interfaces (e.g., eight interfaces). The additional interfaces can provide connection to third party devices, such as security panels, lighting control systems, HVAC zoning systems, and others. The additional interfaces also can be used for connection to external bridges, such as additional PLC interfaces, RF subsystems, communications modules, and retrofit plugs.

The Ethernet board (not shown) on the main board 300 includes four 10/100 base T Ethernet interfaces. The four interfaces provide connections for two secure LAN connections, one unsecure LAN connection, and one unsecure WAN connection.

The control server video board (not shown) can include the following interfaces: video out/VGA out, video in, dual USB—printer, keyboard/mouse interface, IR interface, and PCMCIA slot (optional). The video board provides video I/O as well as IR command transmission. A keyboard and mouse combination can be used with the video board through a USB or USB-to-RF interface (in the case of a wireless keyboard or mouse). A second USB connector can interface with printers, digital cameras, and other peripheral equipment. Functionally, the board accepts video input and digitizes the video for use by the rest of the BC system using the MPEG4 standard. The video board also provides video output as a TV channel for broadcast on connected televisions within the home.

Universal Controller

The universal controller 110 is an optimized form of the control server 100. The universal controller 110 performs a single dedicated task, such as HVAC control. As a result, the universal controller 110 includes only the input and output features that are necessary for the dedicated task. The universal controller 110 can be used in a stand-alone configuration with access through remote dial-up, Internet access, and/or a touchpad interface. The universal controller 110 also can be controlled and monitored by the control server 100. The universal controller 110 communicates with the control server through the RF or PLC networks or by directly wired serial communication. The universal controller 110 can be used to handle applications that are prepackaged for physical distribution, that have outgrown the capability of the control server 100, or that have special features not handled by a standard control server 100. In addition, the universal controller 110 can be implemented as a daughter board to the control server 100.

Figure 4:
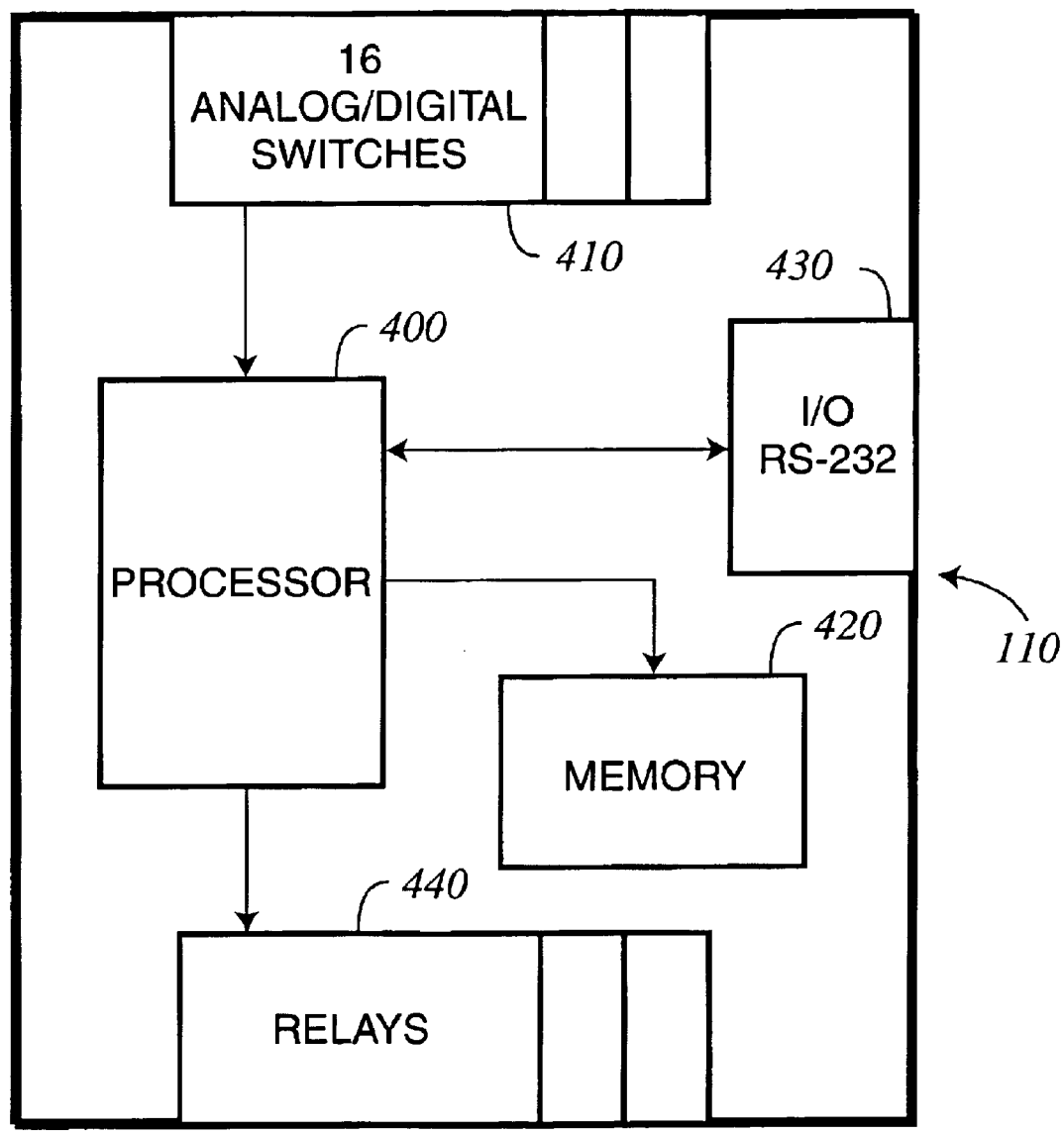
FIG. 4 is a diagram of a universal controller of the system of FIG. 1.

According to the example shown in FIG. 4, the universal controller 110 includes a processor 400 to which a memory 420 is connected. The memory includes communications software for the remote uploading and downloading of data and software for control of specific attached subsystems, such as, for example, HVAC control. The universal controller 110 also includes 16 analog/digital switches for receipt of signals from sensors. An RS-232 communication interface 430 is provided for PC, modem, and other communication with serial communication ports of other devices. Twenty four relays configured in pairs of twelve are provided as output 440. Each relay in a pair can be configured for an individual device that is powered from a common source.

Control Modules

Referring again to FIG. 1, control modules (e.g., 120 and 125) allow legacy appliances that have already been purchased by a homeowner or commercial operator to be integrated into a home automation system. This is important because appliances are expensive and have relatively long operational lives. As a result, appliances typically are not replaced until failure. Therefore, for existing appliances to be incorporated in a total home or commercial automation system, an interface is needed to allow communication with the automation system so that a user is not forced to buy a network ready appliance. The control modules provide such an interface in a form that can be installed easily by the homeowner or business operator.

In addition, manufacturers may not wish to sell devices that are network/system compliant due to the added cost associated with outfitting the appliance with the necessary software and control circuitry. Therefore, a control module can be inserted into an appliance aftermarket, or by the manufacturer, to provide network protocol compliance.

Two examples of control modules are the appliance communications module and the retrofit plug. The appliance communication module acts a bridge between the control server (or remote monitoring service provider) and an appliance by providing protocol conversion that is specific to the appliance. The communication module also allows the control server to control the appliance. The retrofit plug provides for remote monitoring and diagnosis of an appliance, and is easily installed with any appliance.

Appliance Communications Module

Figure 5:
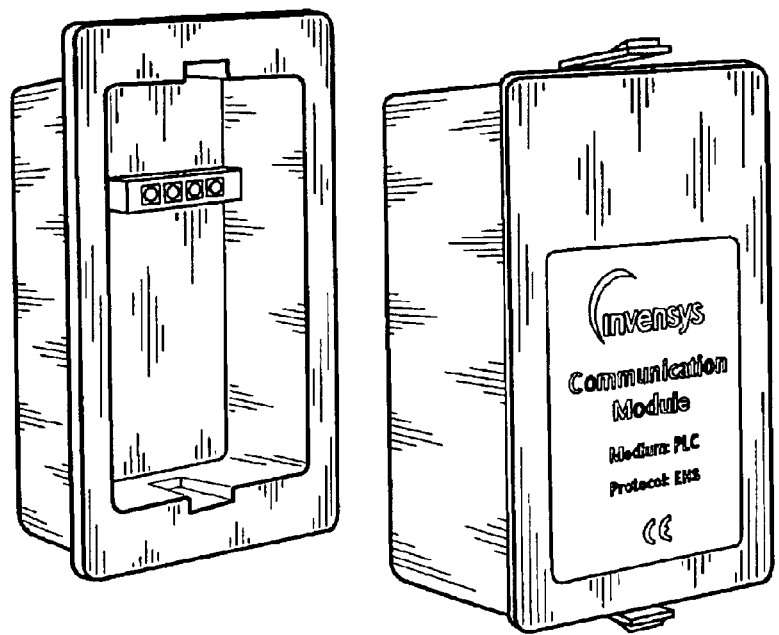
FIG. 5 is a perspective view of an exemplary communications module of the system of FIG. 1.

The appliance communications module 120 is adapted to be received by an appliance having an appliance controller. The communications module 120 includes a communications protocol translator. The communications protocol translator translates signals received from a communications media into appliance controller signals. The translator also translates appliance control signals received from the appliance controller into a communications protocol to be output to an appliance communications network. The communications module 120 also can include a power line transceiver connected to the communications protocol translator and a power line driver connected to the transceiver and the connector. The communications module's connector is electrically coupled to the appliance controller. Alternatively, the communications module 120 can include a radio frequency (RF) transceiver or modem for connection to an appliance network. An example of the communications module 120 is shown in FIG. 5.

The protocol translator translates signals received from the network into appliance controller signals. The translator also translates received appliance control signals according to a communications protocol to be output to the network through the modem or transceiver.

A network ready appliance is also provided. The network ready appliance includes an appliance controller having a communications port. The appliance also includes a cavity, defined by walls, that is adapted to receive the communications module 120. An opening in a wall of the appliance allows access to the cavity. A connector is attached to one of the cavity walls. A communications line connecting the communications port and the connector also is provided. The connector is electrically coupled to the appliance controller or to the main power supply. The network ready appliance further includes a detachable cover provided over the opening to protect a user from electric shock. Alternatively, the appliance connector can be recessed in a cavity to protect the user against shock.

The communications module is described in detail in U.S. patent application Ser. No. 09/511,313 title "COMMUNICATION MODULE" which was filed Feb. 23, 2000, and is incorporated by reference in its entirety.

Retrofit Plug

Figure 6A:
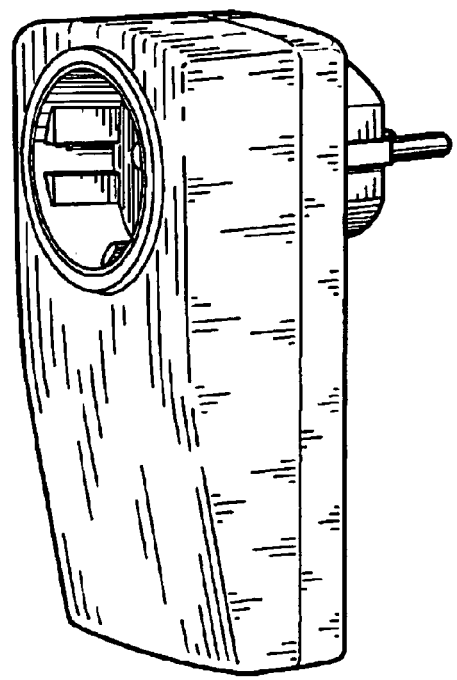
FIG. 6 is a perspective view of an exemplary retrofit plug.
FIGS. 6B–6D are block diagrams of a retrofit plug of the system of FIG. 1.

The retrofit plug 125, shown in FIGS. 6A–6D, is a plug-through device that is either attached in line with the main appliance electrical supply or internally in line with a main control board interface connector of an appliance 130. As shown in FIG. 6A, the retrofit plug can be installed on legacy equipment by simply connecting the retrofit plug 125 to the pins of the appliance that are used to supply power to the appliance. As a result, a legacy appliance can be easily incorporated into a network to allow monitoring and control of the appliance by a homeowner without the need for custom or professional installation.

As one example of an internal connection, control signals inside certain refrigerators pass through a marshalling connector connected to the main control board. By connecting a retrofit plug to this connector, all signals within the refrigerator can be tapped for diagnostic data. The diagnostic data may be sent to the control server 100 that monitors the appliance 130, for example, through the PLC network 3. The data gathered from the appliance 130 can be stored by the control server 100 or downloaded to a remote database maintained by a service provider.

In a standalone application, the control server 100 can be replaced by a gateway connected to a PLC network. Data from the retrofit plug can be sent through the PLC network to the gateway. The gateway transmits the data to a service provider monitoring the appliance 130. The plug may operate as a stand-alone unit by equipping the plug with a modem to communicate with an external computer (e.g., as provided by a monitoring service). The retrofit plug 125 also can be equipped with an RF transceiver so that the plug may be incorporated in a wireless network 4 for monitoring and control of an associated appliance.

Figure 6B:
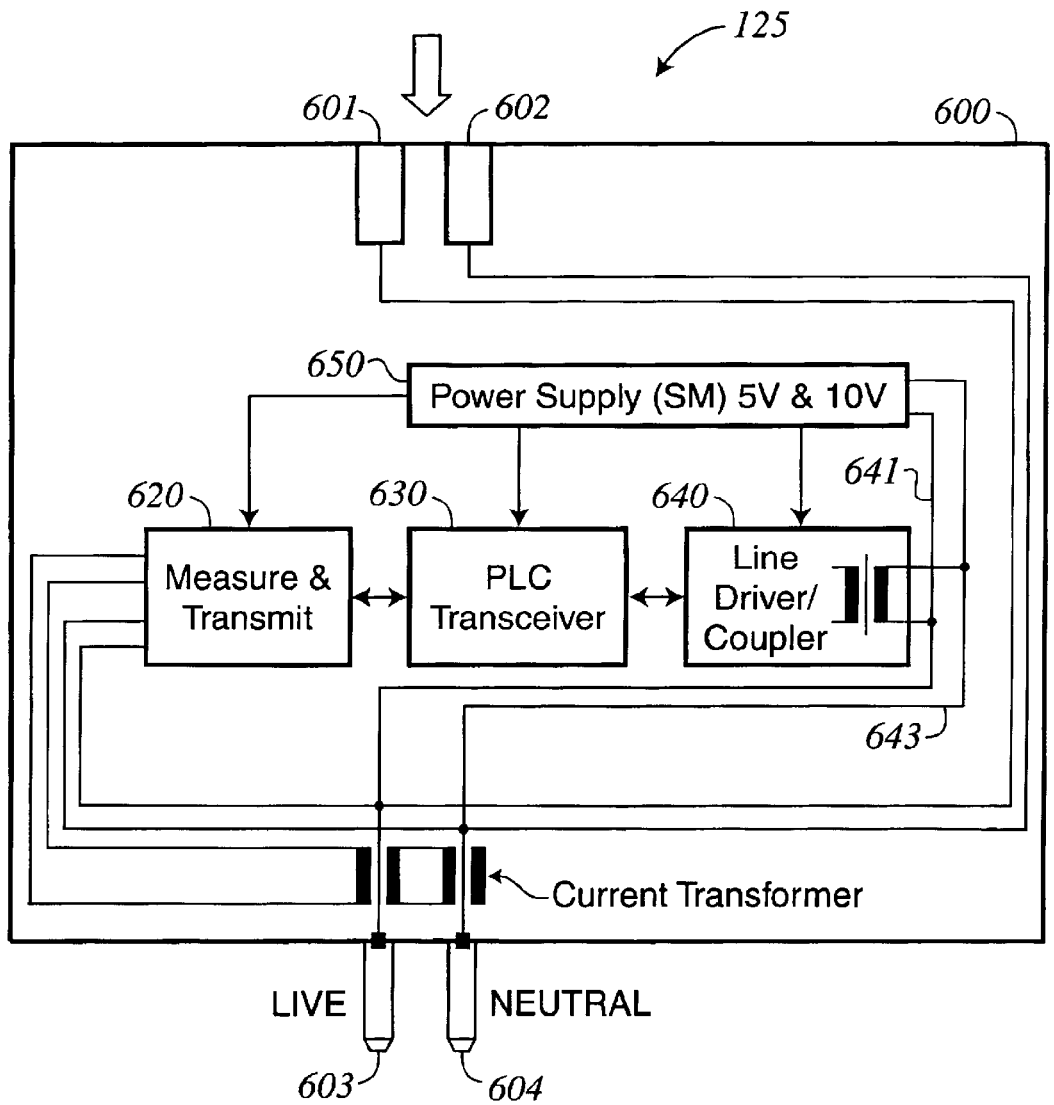
Figure 6C:
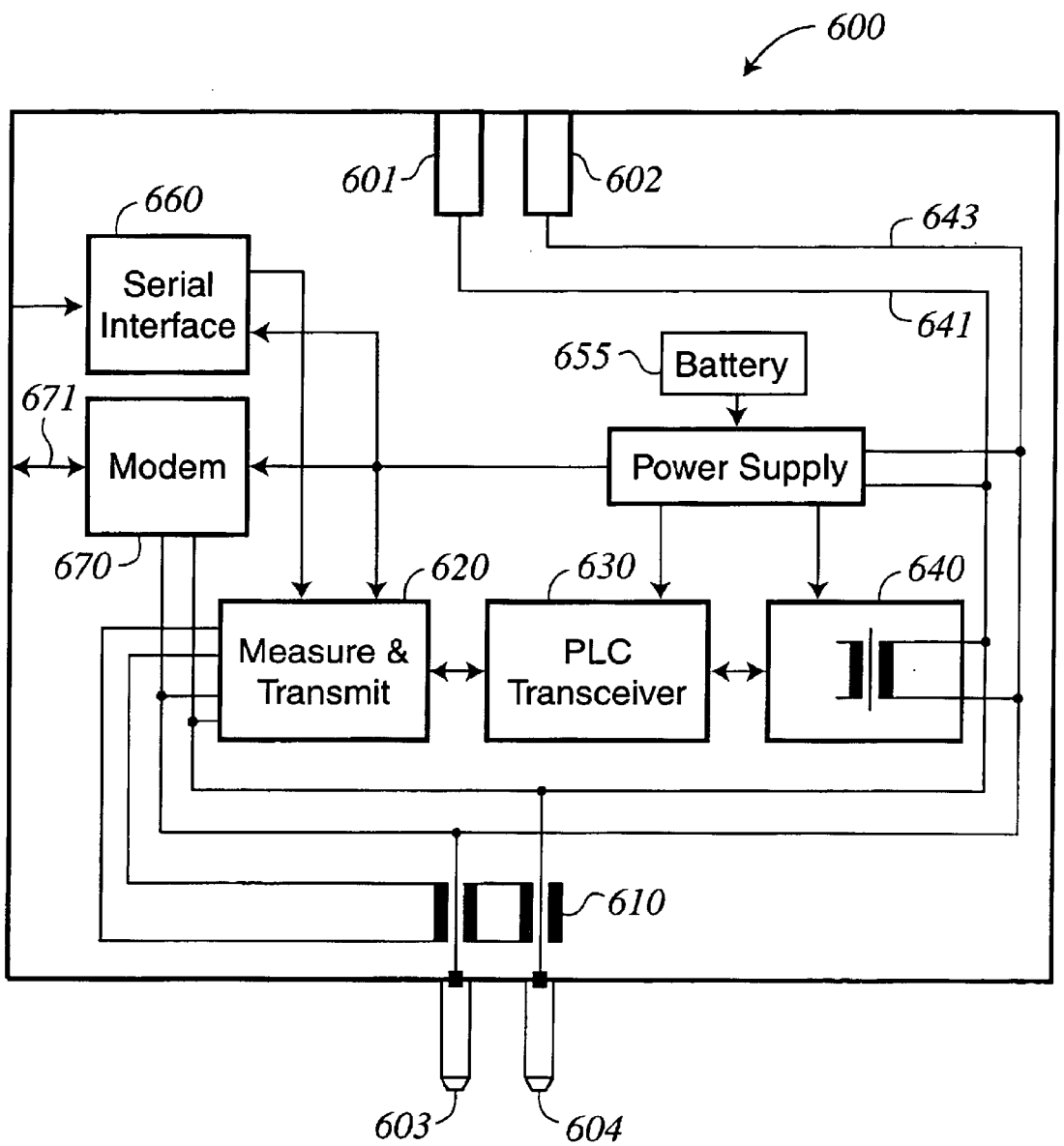
Figure 6D:
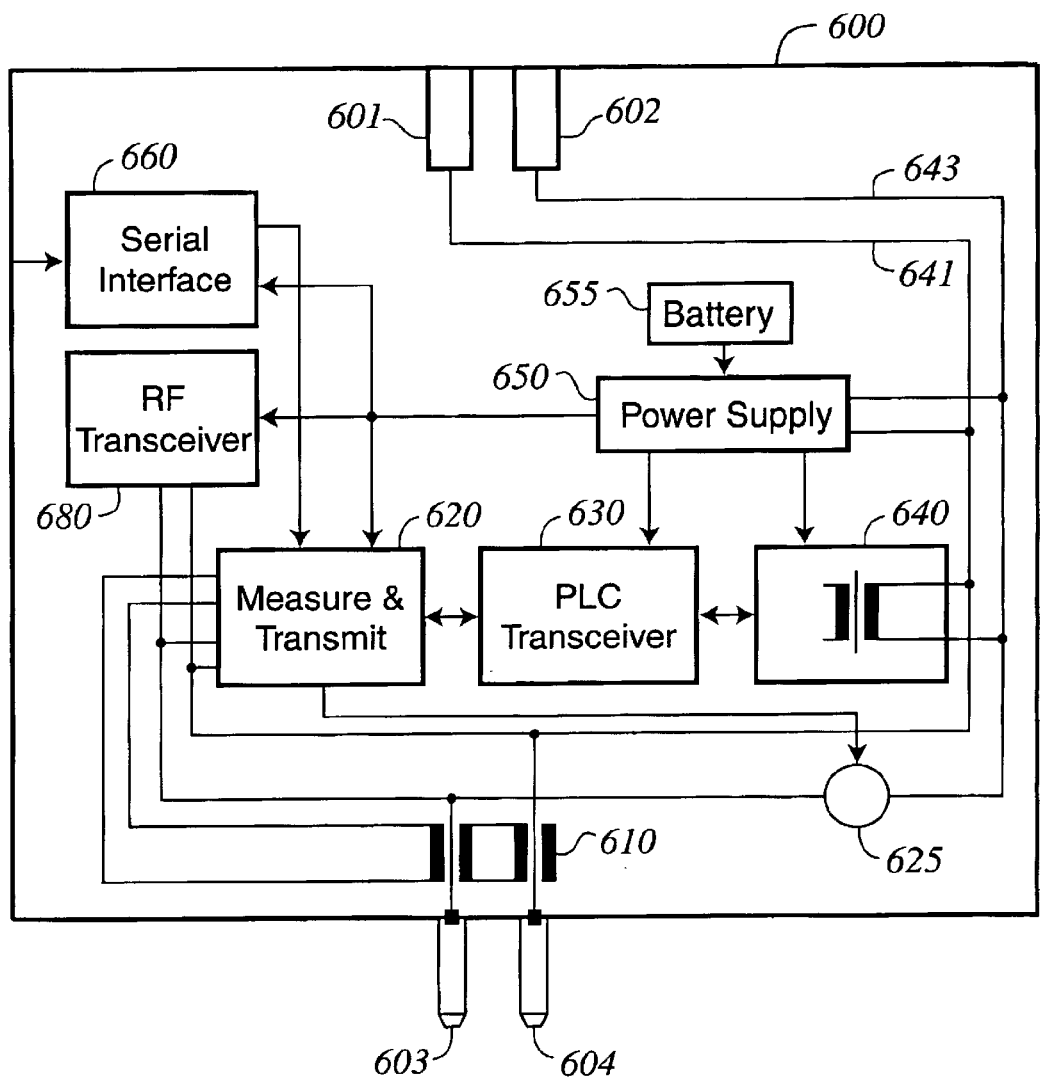

FIG. 6B shows an exemplary retrofit plug 125 that provides an interface between an appliance's electronic control system and the control server 100. The retrofit plug 125 has an outer housing 600 made of, for example, an electrically-insulative plastic (class II) or (class I). The retrofit plug can include a number of couplers. For example, the housing 600 includes slots 601 and 602 for connection with pins from the appliance 130, for example, on a power cord, that are used to supply power to the appliance 130. Pins 603 and 604 extend from the housing for connection with the mains that supply power to the appliance 130. Although only two pins and two slots are shown in the example of FIGS. 6B–D, additional pins and slots may be included as needed to be compatible with any particular appliance's power supply. For example, a retrofit plug could attach to a three pin connector by adding an additional slot and pin for an earth connection or to a four pin connector having two live pins, a neutral pin, and a ground pin by adding slots and pins for the second live pin and the earth pin.

The retrofit plug 125 includes a power supply 650 for supplying power to a measure and transmit circuit 620, a power line communication (PLC) transceiver 630, and a line driver 640. The power supply 620 powers the retrofit plug's components (620, 630, and 640) by converting the appliance AC voltage (e.g., 100V to 264V and 50/60 Hz) to a 5/10V DC voltage. The power supply 650 receives power from pins 603 and 604 through lines 641 and 643.

The retrofit plug includes monitoring circuitry. For example, a measure and transmit circuit 620 is connected to a current transformer 610 to measure the current being drawn by the appliance attached to the retrofit plug 125. Other circuitry that could be used to monitor the current drawn by the attached appliance includes a Rogowski coil or a shunt.

The measure and transmit circuitry 620 may include a processor (e.g., an ASIC, a DSP, a microprocessor, or a microcontroller) and memory (such as an integrated circuit (IC) memory or a flash memory). The measure and transmit circuit 620 can simply monitor and report the current drawn by the attached appliance 130. Specifically, the measure and transmit circuit 620 may monitor current draw timing, duration, and amount. In more sophisticated applications, the measure and transmit circuit can be upgraded to perform bi-directional communication by translating between a communications media protocol used by the control server 100 and the appliance's control protocol. In addition, if the appliance's load current is measured, an indication of power can be derived from the square of the load current. Line voltage may be measured and multiplied by the load current to measure true power consumption.

The current draw data or power data can be stored by the measure and transmit circuit 620. The measure and transmit circuit 620 can be programmed to periodically send the measured data to the control server 100 as part of a general monitoring function, such as, for example, energy management and logging functions. In addition, the measure and transmit circuit 620 can be programmed to compare measurement data to specific electronic signatures stored in a table in the memory of the retrofit plug 125. The measure and transmit circuitry can send messages to the control server 100 in response to events which indicate a state of the appliance 130 requiring some further action (e.g., shut off power).

The retrofit plug 125 also includes a communications circuit. The communications circuit sends data from the measure and transmit circuit to a remote processor, such as, for example, the control server 100. The communications circuit may also receive signals from a remote processor, such as, for example, the control server 100. The communications circuit may include a transmitter and a receiver or a transceiver, a power line communication (PLC) transceiver 630, and a line driver 640. Measurement data is supplied to the PLC transceiver 630 and are coded for PLC transmission on the PLC network 3. The PLC transceiver 630 operates a line driver 640. The line driver 640 places the measurement data as PLC coded signals on lines 641 and 643 according to a network protocol.

The PLC coded signals are supplied by the retrofit plug to the external power circuit that supplies power to the appliance. The control server 100 monitors the external power circuit to receive the PLC coded signals. In this way, the control server 100 can monitor appliances connected to the external power circuit and the appliances can exchange data with the control server 100 or other appliances connected to the network.

The control server 100 or a remote monitoring service is able to perform diagnostic interpretation about the appliance 130. In this manner, the BC system can determine the health of the appliance, the appliance's current function (e.g., how many burners are on, oven capacity, temperature monitoring in a refrigerator, and washer and drier cycles including length), and device failure (including cause). For example, if a current signature or power usage for the light bulb in a refrigerator is detected as being active over an extended period of time, the control server 100 can determine that an open door condition exists and can generate a message for display on an interface 150 to alert the user to shut the door.

The retrofit plug 125 also can include a power-switching device under control of the measure and transmit circuit 620. The power-switching device enables remote shutdown of the attached appliance, for example, through the retrofit plug 125, if a situation occurs that may damage the appliance if operation is continued or if a hazardous condition may result from continued operation. The power-switching device also can permit dimming and variable current flow regulation for remote control of the appliance.

The retrofit plug 125 can be designed specifically for a particular appliance. As a result, the retrofit plug 125 can perform sophisticated diagnosis, monitoring, and control specific to the appliance. Alternatively, the retrofit plug 125 can contain sufficient memory that control data or programs can be downloaded to the plug from the control server 100 through the PLC network. The software and data may be provided directly by the service provider. Software also may be installed in the field using a flash memory chip that is inserted into the retrofit plug 125.

As shown in FIG. 6C, an optional battery 655 can be connected with the power supply 650 to provide power to components of the retrofit plug in the event that power is lost. The battery may be a rechargeable battery that charge while the retrofit plug is supplied with power, if the battery is not in a fully charged state.

A serial port or other communications interface also can be provided in the retrofit plug to provide additional communication capabilities. The serial interface may be used for connection with another sensor to provide additional data about the device connected to the retrofit plug 125. The additional data can be transmitted to a remote monitoring device using the PLC network.

Other types of communications media also can be supported by the retrofit plug. As shown in FIG. 6C a modem 670 is provided within the retrofit plug 125 to provide communication to a network through a phone line. Alternatively, a wireless modem could be used for remotely located appliances where a phone line may not be available. The processor in the measure and transmit circuit 620 handles modem dial-up to an external network and provides buffering for the two-way data transfer on line 671. A phone line can be attached to the data transfer line 671 by adding a RJ connector in the housing of the retrofit plug 125. The modem 670 does not have to be included within the retrofit plug 125, instead, the modem can be a snap-on attachment to the retrofit plug 125.

As an example, the modified retrofit plug with serial port and modem can be used to monitor a commercial freezer. A retrofit plug 125 is installed on the main power supply to the freezer. In addition, a temperature sensor is fitted inside the freezer compartment to measure the freezer's interior temperature. The temperature sensor is attached to the retrofit plug 125 using the serial port. The battery provides power capability to the retrofit plug 125 and its components. In addition, the retrofit plug 125 has a telephone modem. In this case, if the main power supplied to the freezer fails and the freezer temperature approaches 32 degrees, the retrofit plug 125 can sense the rise in temperature using the remote temperature sensor and dial the operator or monitoring service to alert that food spoilage is possible.

Operator Interfaces

Figure 7A:
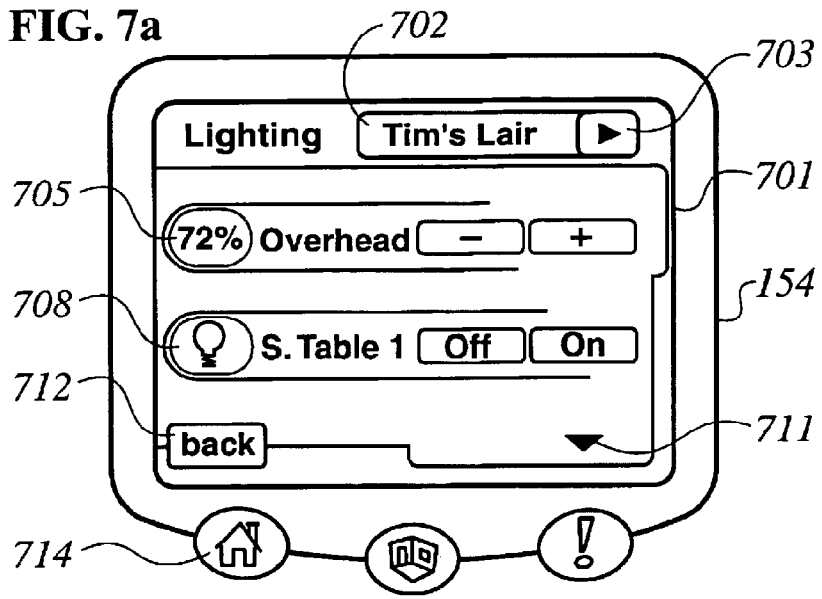
FIGS. 7A–7C are exemplary screen shots of touchpad user interfaces of the system of FIG. 1.
Figure 7B:
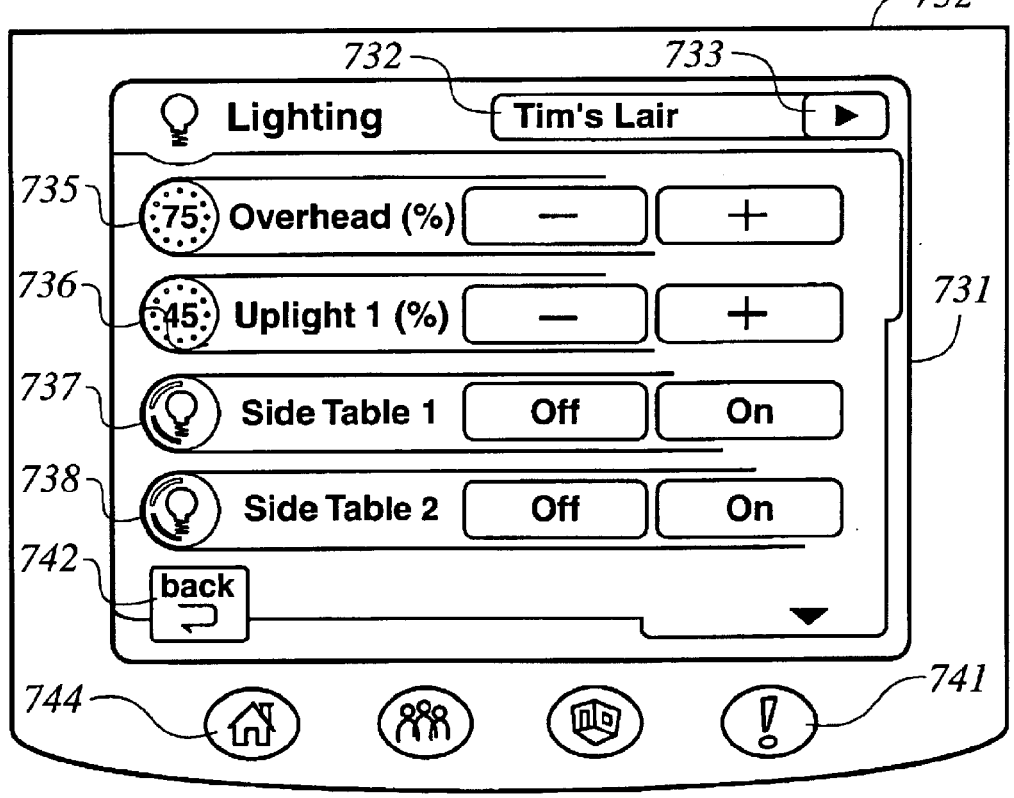
Figure 7C:
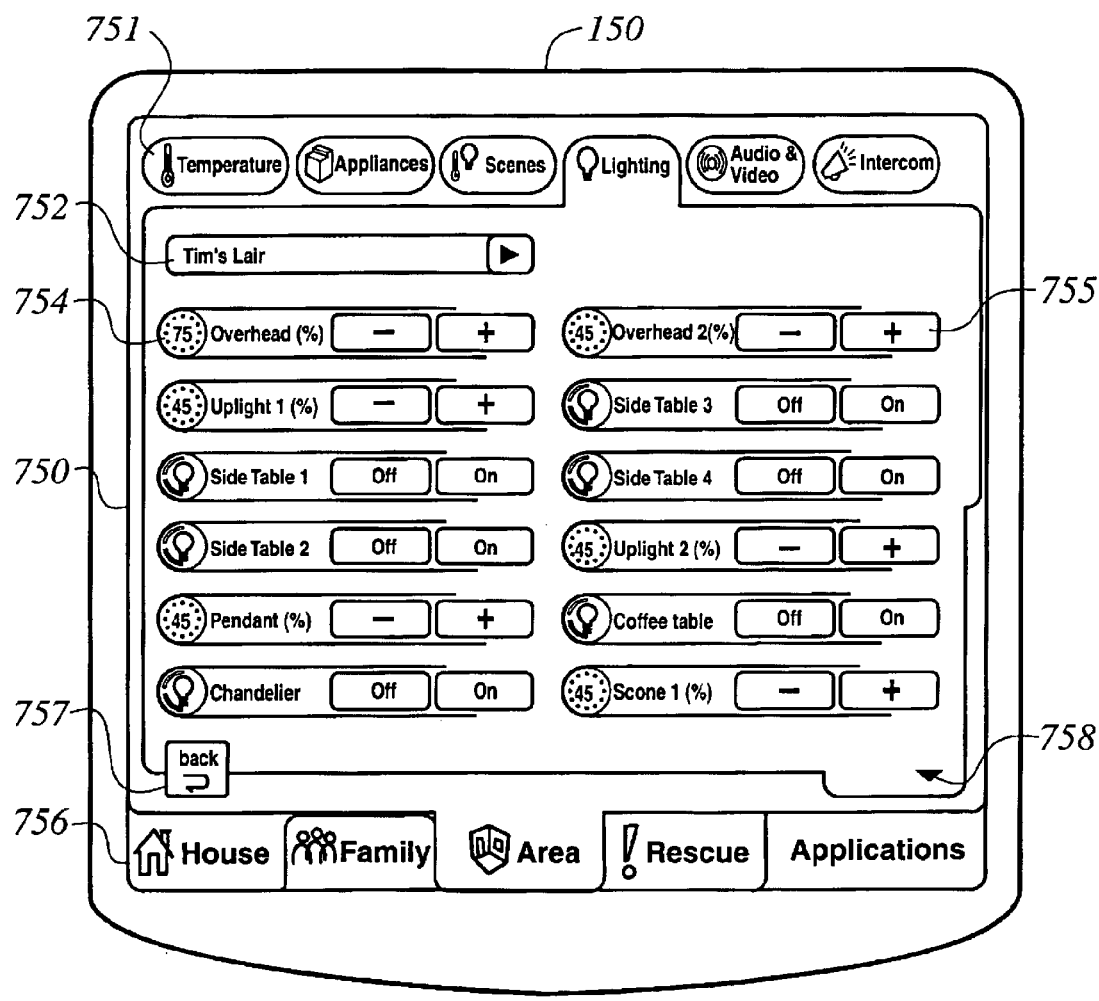

Operator interfaces that can be used with the BC system include, for example, single room touch pad, small touchpad, standard touchpad, portable tablet, PC, and web enabled phones. In general, the look and feel of the operator interfaces is consistent between each interface where possible, and may look as is shown in FIGS. 7A–7C.

Single Room Touchpad

The single room touchpad is basic in design and is intended for installation into a standard light switch box. The touch pad is capable of controlling at least two functions such as temperature and lighting. The single room touchpad also can accommodate an intercom for communication between rooms in the home. Through use of RF or PLC communications, the touchpad may be sized to fit in a standard switch box for ease of installation and integration.

Small Touchpad

The basic functionality of the small touchpad is that of a home automation system controller or room controller. Where appropriate, colors and sounds can be used to catch a person's attention or to signal an alarm. An exemplary small touchpad 154 is shown in FIG. 7A.

The small touchpad 154 includes a display, such as, for example, a 2.6" color TFT display. The display 701 shows the controls for lighting in a room. A room selection bar 702 displays the area that the small touchpad is being used to control. An arrow button 703 allows the user to switch between multiple areas. Control bars are used to control appliances within the area, such as, for example, a control bar 705 for overhead lighting and a control bar 708 for a table light. The amount of overhead lighting can be adjusted by selecting the + or − buttons 706 and 707 on the display. The side table light 1 can be turned on or off using the buttons 709 and 710 on control bar 708. Additional control bars, if any, can be accessed by using the down arrow 711. A back button 712 navigates the user to the previous display. Selections can be made by touching the screen using a stylus, a finger, or the like. Three buttons are provided for controlling the display of the small touchpad 154.

Standard Touchpad

The standard touchpad 152 is a sophisticated operator interface designed for more enhanced presentation of information. The standard touchpad includes a 4 inch, 320×240 pixel personal data assistant (PDA)-style display and is capable of displaying video images as well as textual or icon based images. It is also capable of presenting web content in the manner of alerts or breaking news items. The standard touchpad 152 provides alarm and alert notification by means of color and sound, examples of which are:

Red-Flashing with buzzer—extreme alarm such as fire or intrusion detection;

Red with beeper—alarm such as system fault or predefined alarm condition (the two year old has entered the pool area);

Yellow with beeper—general alert such as hurricane warning or other weather or news advisory; and Green with low level beeper—general information, such as clothes are ready from the dryer.

Being more sophisticated, the standard touchpad 152, which may be the only operator interface available, is not bound to controlling a single portion or subset of the BC system, and, instead, is capable of looking at the whole environment controlled by the BC system. It also is capable of configuring the system. An option for video display allows the standard touchpad 152 to present low-grade camera images such as, for example, from a camera positioned at the front door. A speaker and microphone can be included to provide an intercom with the video feature.

The standard touchpad 152 builds on the display of the small touchpad 154. The standard touchpad includes a display 731. A room selection bar 732 appears at the top of the display. The user may switch between rooms using the arrow button 733. Multiple control bars 735–738 also are displayed. Additional control bars can be accessed by using the down arrow 741. A back button 742 is provided for navigating back to the previous display window. Four keypad input buttons 744 are provided for immediate navigation to preset display windows and to manipulate the display window 731.

The standard touchpad 752 can be mounted onto a wall and hard wired. The standard touchpad 752 also can be used as a portable unit having a cradle for storing and re-charging the unit when not in use.

Portable tablet

A portable tablet 150 can be used to communicate with the BC system provided that required connectivity options are available. The portable tablet 150 is used to present all aspects of the standard touchpad devices as well as more detailed configuration options. In addition, the portable tablet provides video and web browsing capabilities. The portable table may have a 12" display and may be used in the distributed video network to control all televisions and video devices. As a result, a parent could use the portable tablet to flash a message on the children's TV—"its time for dinner." The portable tablet may be implemented using a web pad.

The web pad interface includes an applications bar 756 that allows the user to switch between the various applications supported by the BC system. A tool bar 75 for selecting specific features, such as, for example, a particular appliance to control, is provided on the top of the display. A room selector arrow 753 also is provided. The portable table 150 is able to display a number of control bars (754, 755). A down arrow 758 provides selection of additional control bars associated with the appliance, if necessary. A back button 757 is also provided to move to the previous display screen.

Video Distribution Network

Figure 8:
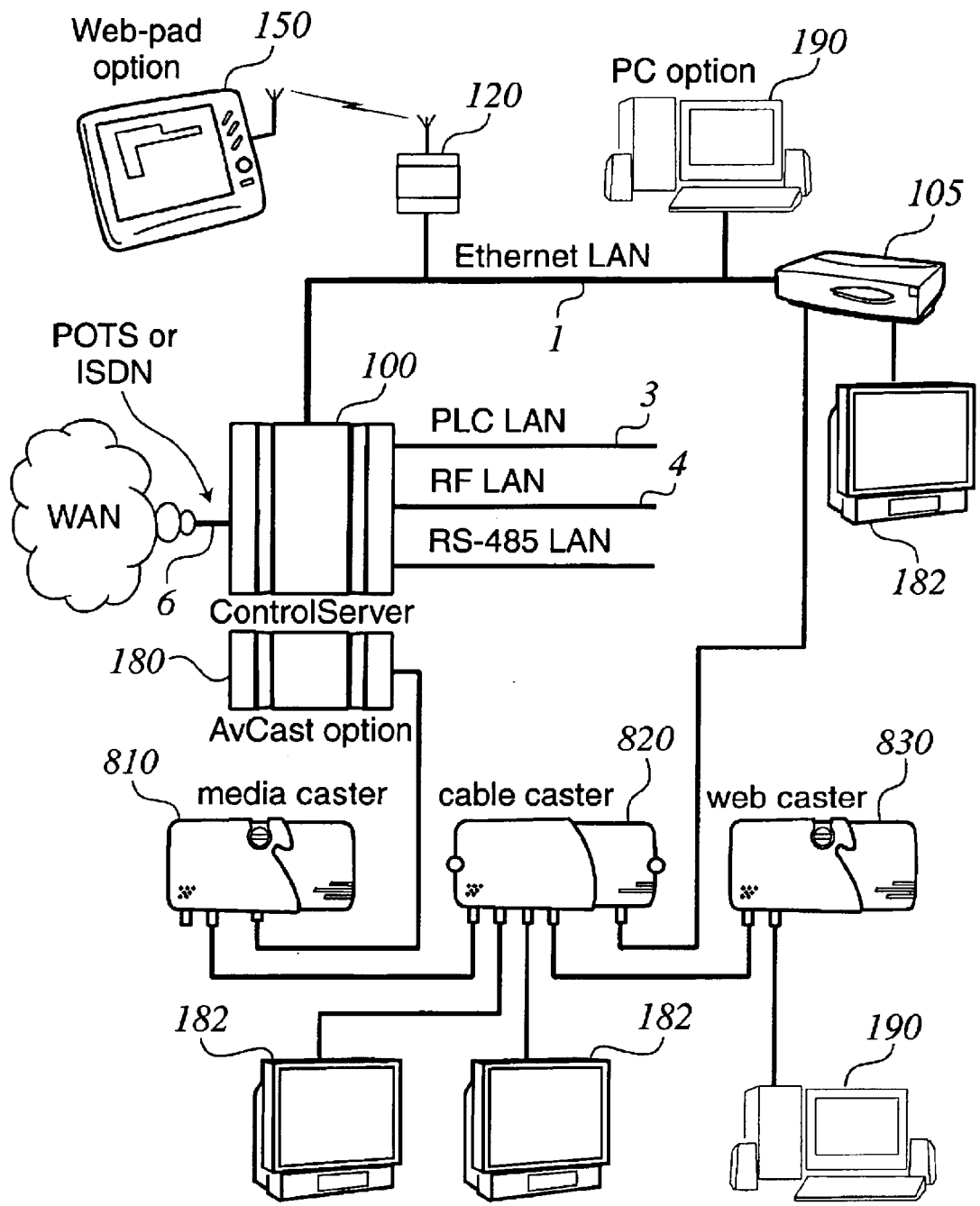
FIG. 8 is a block diagram of a distributed video network.

As shown in FIG. 8, a BC system includes a control server 100 connected to a number of primary networks including: an Ethernet LAN 1, a PLC LAN 3, an RF LAN 4, an RS485 LAN, a WAN (connected by a POTS or ISDN line), and a video distribution network 2. The video distribution network 2 includes a AvCast daughter board 180, a media caster module 810, a cable caster module 820, and a web caster module 830. The AvCast daughter board 180 plugs into a slot on the control server 100. The AvCast daughter board 180 can include the following interfaces: video out/VGA out, video in, dual USB—printer, keyboard/mouse interface, IR interface, and PCMCIA slot (optional). The video board provides video I/O as well as IR command transmission. A keyboard and mouse combination can be used with the video board through a USB or USB-to-RF interface (in the case of a wireless keyboard or mouse). A second USB connector can interface with printers, digital cameras, and other peripheral equipment. Functionally, the board accepts video input and digitizes the video for use by the rest of the BC system using the MPEG4 standard. The video board also provides video output as a TV channel for broadcast on connected televisions within the home.

The media caster module 810 is a digitally-tuned audio-video modulator with user-selectable UHF or CATV channels. The media caster module 810 is individually addressable. The media caster module 810 allows signals from the control server 100 to be displayed on TVs 182 by converting the video output from the control server 100 to a TV channel. The resulting converted signal can be distributed to a number of TVs 182 using the cable caster module 820. Using the output TV channel, the control server 100 can broadcast video data, virtual control panels, security camera video output, messages, alarms, and control interfaces to any connected BC system interface.

The cable caster module 820 provides bi-directional signal-splitting with 6 dB of amplification to compensate for cable loss. The cable caster module 820 distributes a video signal feed to any connected TV 182 while providing enough amplification to ensure crisp TV pictures despite long cable runs and signal-splitting.

The web caster module 830 converts SVGA and audio inputs to a TV signal. The converted signal can be distributed to multiple TVs 182 and interfaces (e.g., 190 or 150) using the cable caster module 820. The web caster module 830 allows the data displayed on a PC screen 190 to be viewed on a TV 182. As a result, the TV 182 can be used as a second monitor for viewing, for example, web pages.

A gateway 105 offers broadband connection to a CATV system. The gateway 105 connects with the control server 100 through the high-speed Ethernet link 1 using, for example, a Cat5 cable. When used with the video distribution network 2, video signals can be routed through the media caster module 810 and cable caster module 820 to other TVs 182 using standard co-axial cable. In addition, the video signal from the gateway 105 can be fed directly into the cable caster module 820 for distribution by co-axial cable throughout a building.

The gateway 105 provides a high-speed link enabling services such as, for example, video on demand, from the CATV connection. The high-speed link also provides a fast Internet connection for browser software running on the portable tablet 150 or the 90. Services, such as teleshopping, can be provided through the video distribution network 2, if supported by the cable service provider. The gateway 105 also provides a high-speed data link to the rest of the home network 1 supporting real-time video capability. The gateway 105 can be implemented as a standalone unit or as a plug-in module in the control server.

Smart Appliances

Smart appliances (e.g., 135) are network ready appliances that can be connected to the BC system without additional modification or interfaces. Once connected to the BC system, a smart appliance can be controlled by the control server 100. In addition, the smart appliance can be remotely controlled through use of a virtual control panel displayed on a BC system interface, such as a portable tablet 150. A smart appliance has either a communications module or a smart module that connects to the internal appliance controller to provide compatibility with the control server 100. The smart module and virtual control panel are described in detail in copending U.S. application Ser. No. 09/378,509, titled "DISTRIBUTED LIFE CYCLE DEVELOPMENT TOOL FOR CONTROLS" which is incorporated by reference in its entirety.

Retrofit Damper

Figure 9:
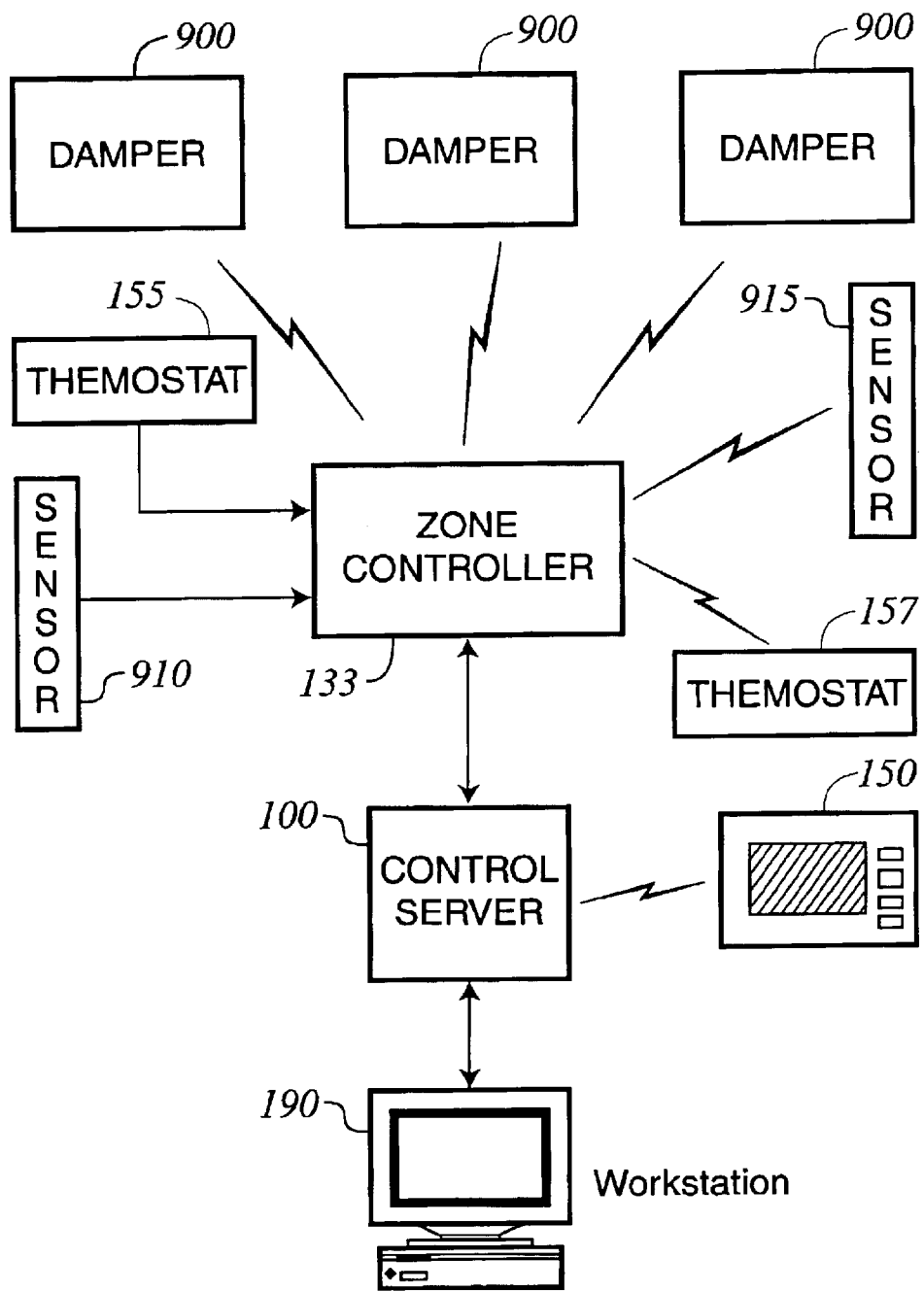
FIG. 9 is a block diagram of a retrofit damper system.

A wireless forced air damper for zoned HVAC control is shown in FIG. 9. The damper 900 is available in industry standard sizes to replace floor, wall, or ceiling registers. The damper 900 communicates with a smart HVAC zone controller 133 using wireless RF communications signals 901. A sensor 910 can be placed in the area serviced by the damper 900 to report local conditions to the zone controller 133. The sensor 910 communicates through the RF network 3, the PLC network 4, or through direct wiring to controller 133. Alternatively, the sensor 910 can be included in the damper 900 as described below. Additionally the sensor can be a wireless sensor 915. The zone controller 133 can be implemented as a stand-alone unit. Alternatively, the zone controller 133 can be supervised by the control server 100. If incorporated in the BC system, the zone controller 133 can be controlled by any of the BC system interfaces, such as the portable tablet 150. In addition, home manager software can be used to control zone controller 133 according to a number of predetermined modes of operation. Thermostats can be provided to provide user control of individual zones within a building. Existing wired thermostats 155 can be coupled to the zone controller to allow user control of the HVAC system. Additionally, wireless thermostats 157 can also be used. The wireless sensor 915 and thermostat 157 can be incorporated into a single unit.

Figure 10:
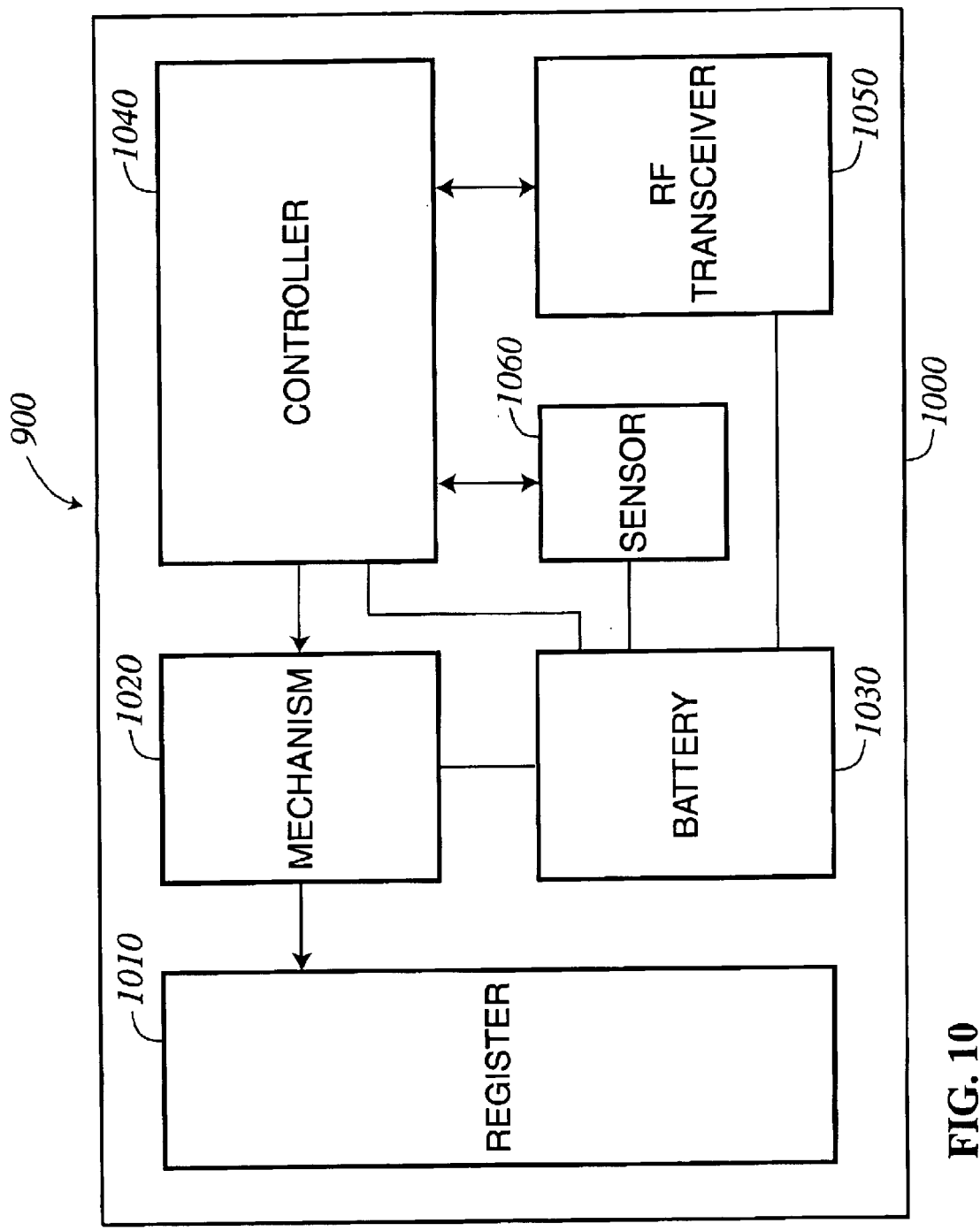
FIG. 10 is a block diagram of a retrofit damper of the system of FIG. 9.

A block diagram of a damper 900 is shown in FIG. 10. The damper 900 includes a register 1010 for controlling air flow through the damper 900. An RF transceiver 1050 receives control signals 901 from the zone controller 133 and transmits status/sensed data to the zone controller 133. A power supply 1030, such as, for example, a battery or other self-contained power source, powers the damper's electrical components so that the damper is self-contained and does not require any additional wiring for power. A mechanism 1020, such as, for example, a solenoid, a spring, a shape memory wire, or a magnetic latching mechanism, is coupled to the register 1010. The mechanism 1020 actuates the register to allow air flow in response to a signal received from the controller 1040. A magnetic switch or latching mechanism having thousands of latching cycles may be used as the mechanism 1020 to reduce power consumption and to extend the operational life of the damper between replacing/recharging of the power supply 1030. For example, the latching system can have one or two magnets. A capacitor can be charged from the battery using a trickle charge. In response to a control signal the capacitor can cause an induction, which actuates the magnet that holds register in one operation state. A second magnet or gravity may be used to return the register to its other operational state. A variable mechanism also may be used to control the register such that the register can be partially opened to regulate air flow (e.g., 100% open, 80% open, 50% open, and closed).

The controller 1040 can monitor the power supply 1030. When the power supply 1030 reaches a minimum charge threshold, the register 1010 is placed in an open state so that the register 1010 is left in the open position if power fails. In addition, the controller 1040 may notify the zone controller 133 that the power supply has reached a minimum threshold. Once notified, the zone controller 133 alerts the user that the power supply 1030 needs to be replaced/recharged. Alternatively, the zone controller 133 may poll the damper 900 to send a measurement of the power supply's remaining charge to the zone controller 133. Upon receipt of the measurement, the zone controller 133 performs the threshold analysis and alerts the user if necessary. A cover or door that is accessible from the room is provided to ease access to the power supply 1030.

When the fan unit on the air conditioner or the furnace is on, or when a preset condition occurs, the zone controller broadcasts a control signal to the controller 1040 to cause the mechanism to activate the register 1010. In addition, the zone controller 133 may selectively open or close dampers 900 based on a control program, a mode of operation, or upon a request from a user interface. Drain on the charge of the damper's power supply 1030 may be reduced by waiting until air flow has stopped before closing the register 1010 to limit the force needed to close the register 1010. A sensor 1060 may be connected to the controller 1040 to measure temperature at the damper 900. The measurement is supplied to the zone controller 133 as input to zone and comfort control software operating in the zone controller 133 or the control server 100.

Figure 11:
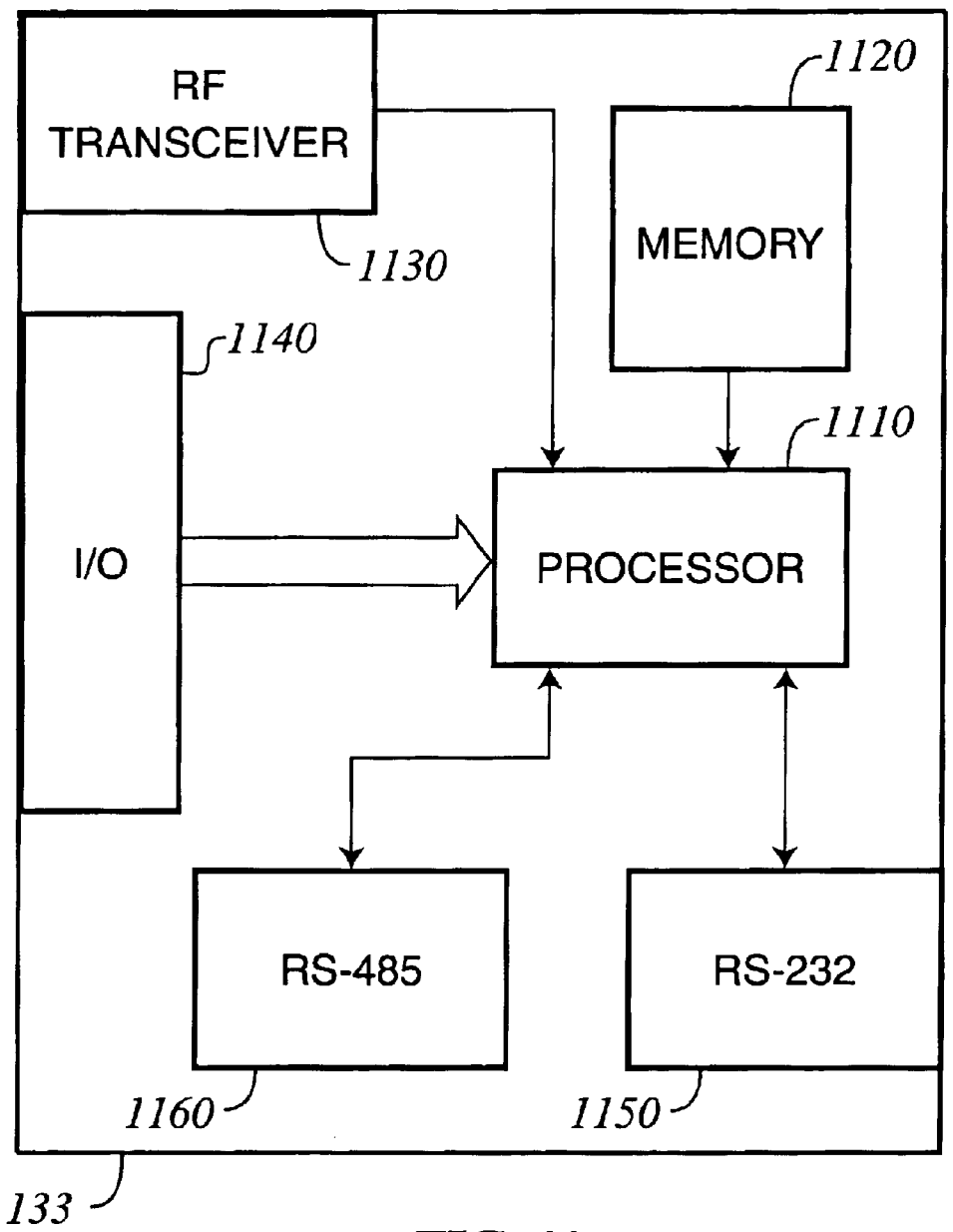
FIG. 11 is a block diagram of a zone controller of the system of FIG. 9.

The zone controller 133 is shown in FIG. 11. The zone controller 133 can be implemented using a universal controller 110. The zone controller 133 includes a processor 1110 for controlling and monitoring the dampers 900. A memory 1120 is provided to store climate control software and for operation and identification of the dampers 900. An RF transceiver 1130 transmits control commands to and receives responses from the dampers in response to the commands. The dampers 900 are periodically polled by the zone controller 133 for status and sensor data. The data can be stored in the memory 1120 for analysis by the processor 1110 or the data may be transmitted to the control server 100 for storage and analysis. If no response is received from a damper 900 after being polled a number of times, the zone controller 133 notifies the user or control server 100 that the damper 900 is not responding and may need servicing. An optional I/O interface 1140 is provided for connection with external sensors 910. An RS-232 interface 1150 allows peripheral equipment, such as a handheld unit or a modem, to be connected to the zone controller 133. An RS-485 interface 1160 is provided to connect the zone controller 133 with the control server 100.

Each damper 900 is assigned a unique HVAC control ID number. The zone controller 133 uses the control ID number to identify a damper. Each installed damper 900 is dedicated to a single zone controller 133 and rejects interference from any other controllers, unless released by an authorized security code stored in the damper 900. Initial configuration of the dampers 900 can be accomplished according to one of the following methods.

According to a first method, zone controller 133 is placed in an initialization mode. Once the zone controller 133 has been placed in the initialization mode, the dampers 900 can be powered up one at a time. Upon powering up, a damper 900 broadcasts a message with the control ID to the zone controller 133. Configuration software in the zone controller 133 acknowledges the received broadcast message, stores the control ID, and prompts the user to identify the location of the damper. After the user enters the location, the zone controller 133 awaits receipt of the next initialization message and repeats the process until the locations of all dampers 900 are identified.

According to another method, barcodes can be used to configure the dampers 900 upon installation. When the damper is installed, a barcode on the damper 900 is scanned using a handheld device with a barcode reader. The barcode encodes the control ID for the damper 900. After reading the barcode, the handheld device prompts the installer to enter the location of the damper 900. The handheld device then associates the control ID with the entered location and stores this information in a table. Alternatively, barcodes identifying predetermined locations are placed in corresponding slots that accommodate the dampers 900. The installer scans the barcode in a slot using the handheld device. The installer then scans a barcode on the damper to read the damper's control ID and associates the damper with the location. After installation of the dampers, the damper control ID and the location data are downloaded to the zone controller 133 by connecting the handheld device to a port on the zone control 133.

According to another method, a barcode identifying the damper's control ID number can be peeled off the damper and placed on a location sheet. The sheet is scanned to determine a damper's control ID number and location. Once scanned, the data is downloaded to the zone controller 133.

After configuration of the dampers, according to any of the methods described above, the zone controller 133 controls the damper units 900 through RF control signals according to the instructions of the zone controller's operational programming. The zone controller 133 can broadcast control messages that are addressed to all dampers, to a set of dampers, or to a specific damper using the control ID numbers.

The above-described system is not limited to dampers. The control system could be applied to other flow control devices, such as hydronic systems using, for example, a valve instead of a register. Although the actuation devices and flow control mechanisms would be specific to the environment, the control circuitry and operation would be substantially the same.

Home Manager Software

The home manager software incorporates a number of fundamental modes of operation. Six exemplary modes are: a stay mode, an away mode, a bedtime mode, a sleep mode, a vacation mode, a wake-up mode, and a custom mode. The stay mode is configured to operate when the home is occupied. In this mode, certain aspects of the home, such as comfort control, are set automatically by the home manager. Other aspects, such as lighting scenes, are independent of the mode and are set either by the occupant or based on time of day occurrences.

The away mode implies that the home is occupied but no one currently is at home. When operating in the away mode, the BC system can override other programming, such as, for example, lighting control, to simulate occupancy and to arm the security system. During operation in the away mode, other system operations, such as energy saving control, can conserve energy by cutting back on hot water or comfort settings.

A bedtime mode (not to be confused with a sleep mode described below) can be incorporated in homes that have children. The bedtime mode is used when the children have gone to bed but there are still one or more adults awake in the home. Bedtime mode activates certain monitoring systems, such as, for example, child monitoring, checking to make sure certain televisions and other entertainment devices are off, and alerting the adults if certain lights come on (e.g., the children's rooms or bathrooms). Using this mode, parents can monitor sleeping children or be alerted when children wake up.

Sleep mode is used to put the house to sleep. While in sleep mode, the BC system arms the security system, and ensures that all doors are closed and locked, all lights and appliances are off, and that comfort settings are altered appropriately.

Vacation mode provides an enhanced state of security when a family is away from the home for an extended period of time. In this mode, lighting and entertainment systems may be used to simulate occupancy. Energy hungry systems, such as, for example, comfort control and hot water, may be reduced to minimum settings. Appliances may be monitored for unnatural activity, such as, for example, activation of the coffee pot (which normally would not switch on in the morning if the family were on vacation). However, the vacation mode can make allowances for house sitters who periodically bring in the mail or check on the house.

Wake-up mode is a choreographed schedule of events that happens as the house leaves sleep mode and enters stay mode. A number of timed events take place in the wake-up mode that can be customized for any particular residence. For example, prior to the alarm clock going off, comfort settings can be altered. If an HVAC zoning system is in place, the comfort settings can be adjusted in bedrooms and bathrooms first. Wake-up mode then increases the setting for the hot water heater, turns on the coffee pot, and adjusts other home systems in preparation for a family getting out of bed. A typical wake-up schedule would include: determine wake-up time based on day and weather, increase hot water temperature, increase temperature in bathrooms, shut off electric blankets, turn on the coffee pot, ramp up lights to simulate sunrise, activate wake-up alarm, turn on televisions for news, adjust comfort control for whole house. This list is exemplary and not comprehensive as any particular residence has a unique sequence of events. Other features can be programmed into the mode as desired by either the user or the service provider.

Custom modes also may be provided these modes may be programmed by the user, downloaded from a service provider over the Internet, or field programmed by a service provider technician on site.

There are a number of hidden modes that are invoked by features within the home manager. An example of a hidden mode is the fire mode. If a fire is detected by the security system, lights are adjusted to aid exit, doors are unlocked, gas to the house is shut off, the HVAC systems are shut down, and emergency numbers are called. Other hidden modes include: distress (robbery), medical emergency, and appliance failure.

Figure 12:
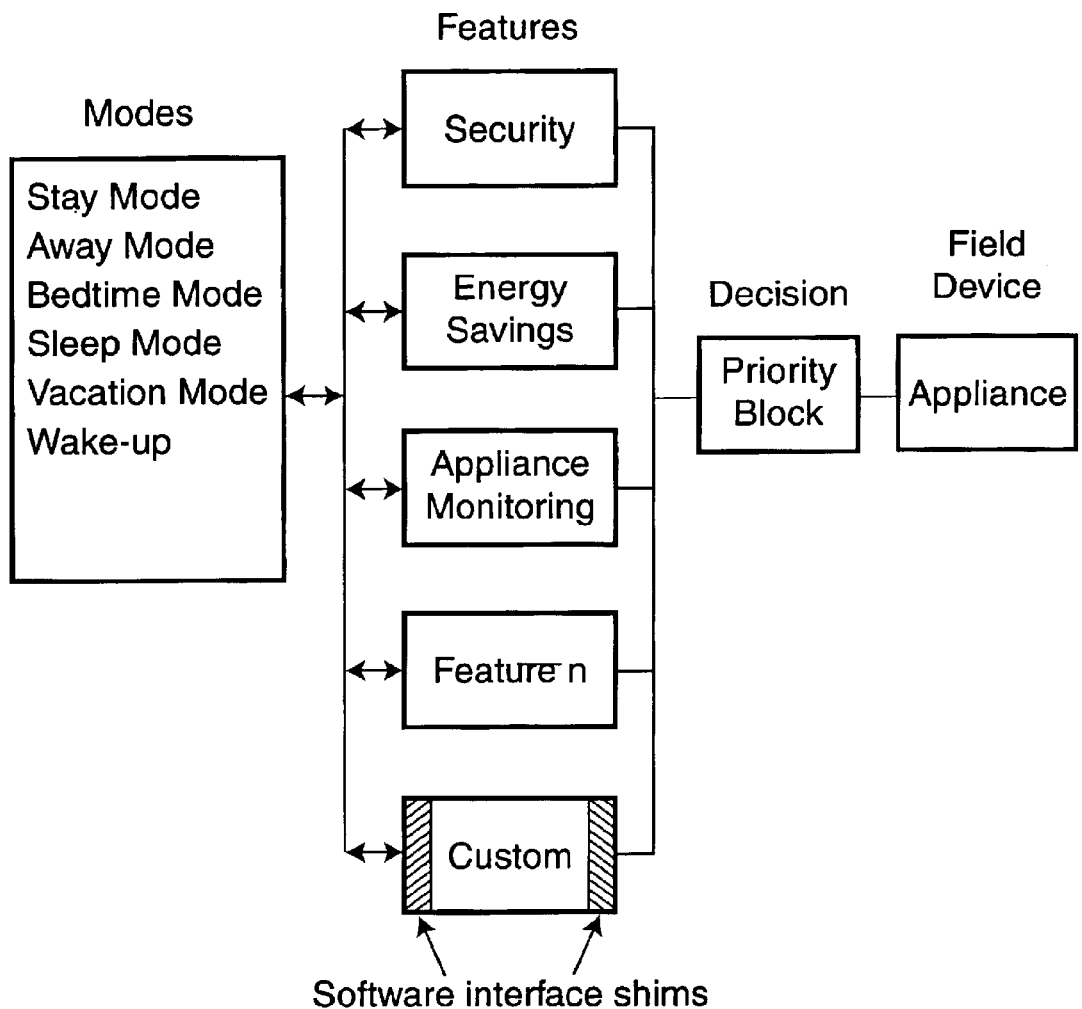
FIG. 12 is a block diagram of function blocks for home manager software.
Figure 13:
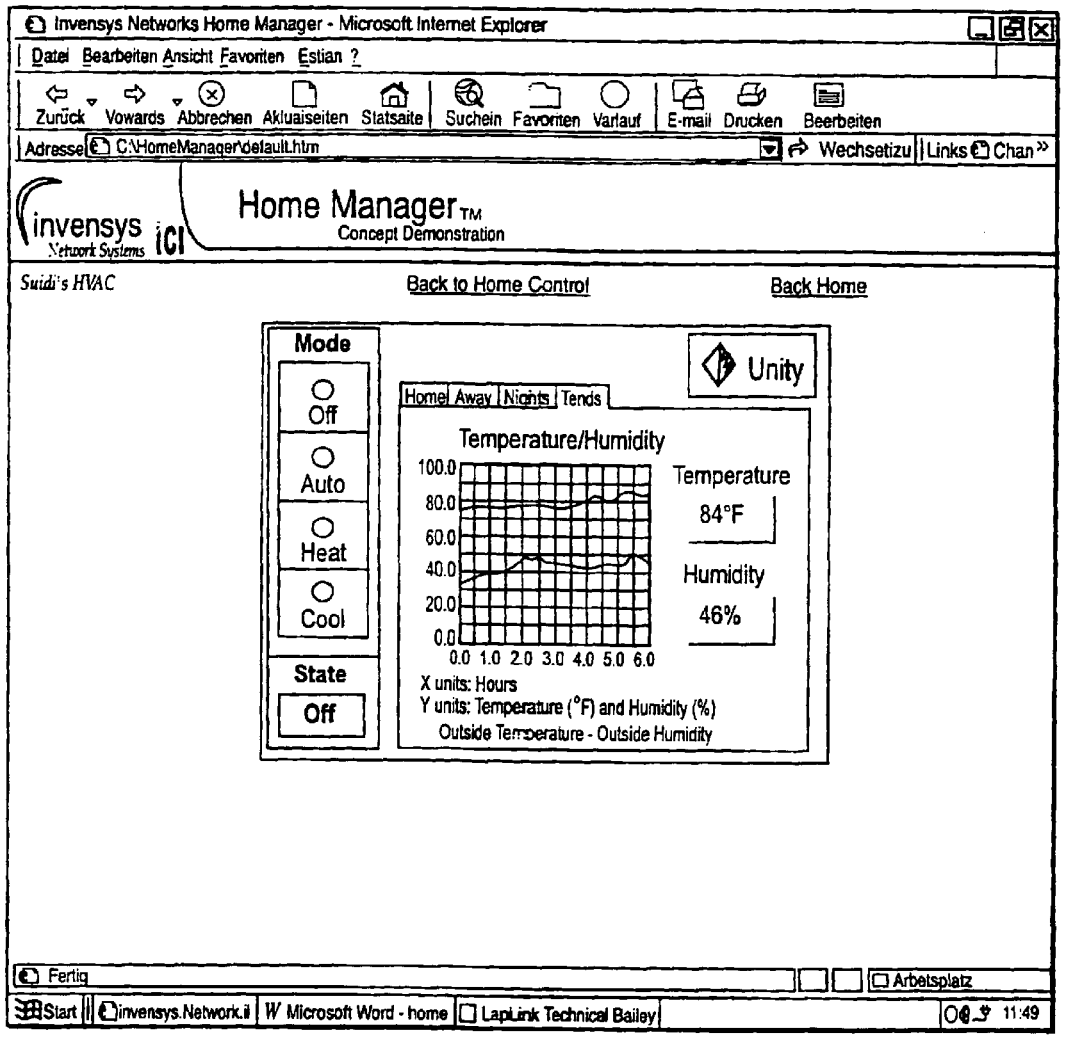
FIG. 13 is a screen shot of the home manager temperature control of the software of FIG. 12.

Architecturally, each device connected to the BC system subscribes to the various features offered in the house manager modes through priority blocks. Each feature responding to a mode has an associated priority setting, for example, a security feature responding to a fire mode has a higher priority level than a bedtime mode setting. FIG. 12 shows the relative positioning of the modes, the various features running on the system, the prioritization of each feature, and control of the field device. Features shown as custom may require additional programming to interface to the home management software.

Each feature also has an associated set of software functionality based on the hardware components available. The BC system automatically functions as described once the hardware is recognized by the BC system.

Enhanced security beyond that provided by a conventional security system is provided by the home manager. The enhanced security feature may supplement a conventional security system present in the home that is connected to the control server 100. Settings available in the enhanced security system include: armed/away mode, armed/stay mode, un-armed, system fault, medical emergency, police emergency, and fire emergency.

The settings for the security system relate to home manager modes in the following way. Both vacation mode and away mode invoke the away setting in the security panel. Both the armed/home and un-armed settings relate to the stay mode for the home manager. Although the armed/home setting does not relate directly to a specific mode, it can be set either by the existing security system or by the home manager on an individual basis.

The home manager can set or receive any of the armed/un-armed modes either locally or from a remote location (e.g., through a remote user or security service provider). Behavior of each of these sub-systems, is described below.

Gas Shut-off Valve

In the fire emergency mode, the gas shut-off valve shuts-off the main gas supply to the house. This feature can be applied to any form of flammable fuel, such as natural gas, heating oil, or propane. In all other modes, the shut-off valve is in the normal state.

Water Shut-off Valve

In all modes, the shut-off valve is in the normal state.

Lighting Interface

In the armed/away setting, the lighting interface can be set to a pre-defined state. The predefined state can include setting individual lights on and off at prescribed times to simulated occupancy. To configure simulated occupancy, the lights are monitored for a period of one week, or as desired by the user. The light activity during this time is recorded by the control server 100 and captured according to a homeowner prompt to copy the activity. After the activity has been stored in the control server database, mode the lights behave as they did during the recorded period whenever the security feature is placed in the away armed.

In the fire emergency mode, perimeter (outside) lights are set to flash at a 50% duty cycle with a 1 second cycle time to attract attention to the home. In addition, lights designated as exit lights are set to a level prescribed by the homeowner. During system configuration, lights are defined as exit lights, perimeter lights, or normal lights. In this way, the homeowner can establish an escape route using the lighting. All other lights are shut off.

In all other modes the lights are set in their normal state.

Door Locks

Doors are locked in the armed/away mode, and are unlocked in the medical emergency mode and the fire emergency mode. In all other modes, the door locks are in the normal state.

HVAC Interface

The HVAC interface can include communications to a sophisticated whole house HVAC zoning system or simply a connection to a programmable communicating thermostat. In the fire emergency mode, the HVAC system is shut down to prevent smoke from being distributed throughout the house. In all other modes, the HVAC system is in the normal state.

Health Monitoring

In the medical emergency mode, any health monitoring equipment that is connected to a person on a routine basis can be activated (if it isn't already). In all other modes, the monitoring equipment is in the normal state.

Child Detection

In the armed/stay mode, if a child is alone in the house, all cook tops are disabled from use without a password to unlock them. In the fire emergency mode, a security company is notified that a child is in the house. In all other modes, the child detection is in the normal state.

Elder Tracking

In the medical emergency mode, the security company will be notified that a elderly or disabled person is in the house. In the fire emergency mode a security company is notified that an elderly or disabled person is in the house. In all other modes, the elder tracking is in the normal state.

Security Cameras

Security cameras are accessible remotely by the BC system. The control server 100 captures a camera image and digitizes it for local display or for access from a remote browser. Data compression can be used to save memory space. In the police emergency mode, the security cameras are automatically set to record on a suitable recording device, such as a VCR, if available. In all other modes, the security cameras are in the normal state.

AVCast

In the fire emergency mode, all television sets in the house are set to the control server TV channel. The control server displays the message "FIRE" on the television screens. If a location of the fire is known, that location is also placed on the screen, for example, "FIRE—basement". In all other modes, the AVCast system is in the normal state.

Away Mode Monitoring

Away mode monitoring is not to be confused with the Armed/Away mode described in the enhanced security section. Away mode monitoring relates to the ability to monitor or control the home while away. The home manager supports a number of different hardware methods for this task including a high-speed broadband connection as well as telephone dial-up. In either case, the control server 100 provides firewall protection against unauthorized access. Away mode monitoring is also supported by web enabled phones or phones with a mini-browser capability. Any device with a browser can be used to access the home manager to control or monitor any aspect in the home.

Appliance Maintenance

Appliance maintenance allows for remote access of appliances within the home. Appliances can include, for example, any kitchen or laundry appliance, water heater, HVAC system, lighting, audio/visual, sprinkler, or comfort control. Connectivity to each appliance is provided by a telephone modem or a broadband connection to the control server, or the like. The control server 100 acts as the interface to the appliances and serves as a firewall to prevent unwanted tampering. All appliance control functions available within the home are allowed from outside of the home provided that the user is authorized to do so. In the event that a catastrophic failure is detected, a service provider can shut-off gas or water to the house to prevent an explosion or water damage.

Some appliances are capable of a certain amount of self-diagnosis, such as detecting a clogged filter. Under these conditions, the appliances can prompt the user to initiate repairs by displaying a message on a local user interface. In other instances, the appliance must be diagnosed either remotely or by a service provider on site. The control server's role in appliance diagnosis is to provide access to data by a remote site and to provide any necessary service prompts locally. The service provider may shut off the appliance if continued operation would damage the appliance.

Enhanced Comfort

Enhanced comfort control involves any aspect of home automation that automatically improves personal comfort. A number of devices, when connected to the control server 100, can be incorporated into the enhanced comfort feature. Examples of such devices include HVAC control, programmable thermostats, a zone control system, ceiling fans, air filtering, humidity control, and automatic blinds.

HVAC control encompasses the broadest aspect of comfort control. HVAC control also can be impacted by an energy management or an enhanced security feature, if available. Programmable communicating thermostats provide the greatest impact on the ability to manage comfort in the home. Fundamentally, the home manager communicates with the thermostat and allows the homeowner to program and configure the thermostat. In addition, other features within the home manager are able to override or alter the actions of the thermostat if needed, for example, when the enhanced security system shuts down the air-blower in case of a fire. Under the energy management feature, the thermostat setting can be adjusted to shed load during high tariff conditions or when the home is unoccupied.

Zoning control is a feature that can provide benefit to virtually every home. There are always instances where one area of the home is hotter or colder than another area. A zoning system uses temperature sensors and variable dampers to adjust the temperature of each zone independently. The home manager supports two forms of zoning: hardwired and wireless.

A hardwired zoning system involves dampers installed inside ductwork communicating to the control server through a central HVAC zoning package, or directly through PLC communications. Similarly, the temperature sensors are connected to the control server 100 either through PLC or through the zoning package.

In the case of a wireless zoning system, RF communications are used to communicate to all temperature sensors and dampers. In this instance, the retrofit damper described above can be incorporated.

Main HVAC control can be provided through direct connection from the control server 100 to the HVAC zone controller unit 133 or to a communicating thermostat, which in turn controls the packaged unit. If the control server 100 is taken off-line for some reason, the HVAC zone controller 133 or communicating thermostat can revert to a conventional operation mode.

Other devices, such as, for example, ceiling fans, humidifier/de-humidifiers, air filters, adjustable skylights, and automatic blinds can respond to an algorithm for comfort control implemented in the HVAC controller 110 or the control server 100.

Energy Savings

The primary method for achieving energy savings is to reduce settings or turn off large energy consuming appliances during non-critical times or peak tariff times. The away mode controlled by the home manager system can lower thermostats, reduce temperature of the hot water heater, coordinate HVAC and appliances based on peak tariff conditions by adjusting thermostats to appropriate extremes of the comfort zone, restricting use of appliances to off-peak times, using automatic blinds and skylights to reduce HVAC demand, and synchronizing HVAC and hot water heater control with the sleep mode by cutting back temperatures during sleep time and bringing them back up as part of the wake-up cycle.

Family Manager

The family manager can be used in conjunction with the away mode monitoring to allow family members to connect to the system remotely. The family manager manages family data and automates certain tasks, such as, for example, maintaining the family calendar, maintaining a family address book, maintaining a family task list with alarms and reminders, and providing a kitchen/laundry assistant. The family manager is capable of being sorted and searched in a variety of different ways. A family member can access the entire family task list or just the member's personal tasks.

The family calendar contains events of the following profiles: single time events, periodic events (weekly, monthly, yearly), and alarmed events. Events can be assigned to one or more family members and carry details such as start time, end time, and priority. The family address book is segmented by family member and has annotations for entries related to, for example, family, business associates, service providers, theaters, and shops. Closely associated with the calendar is the task list. Tasks are assigned a degree of importance, time needed for completion, and family member assigned to the task.

Figure 14:
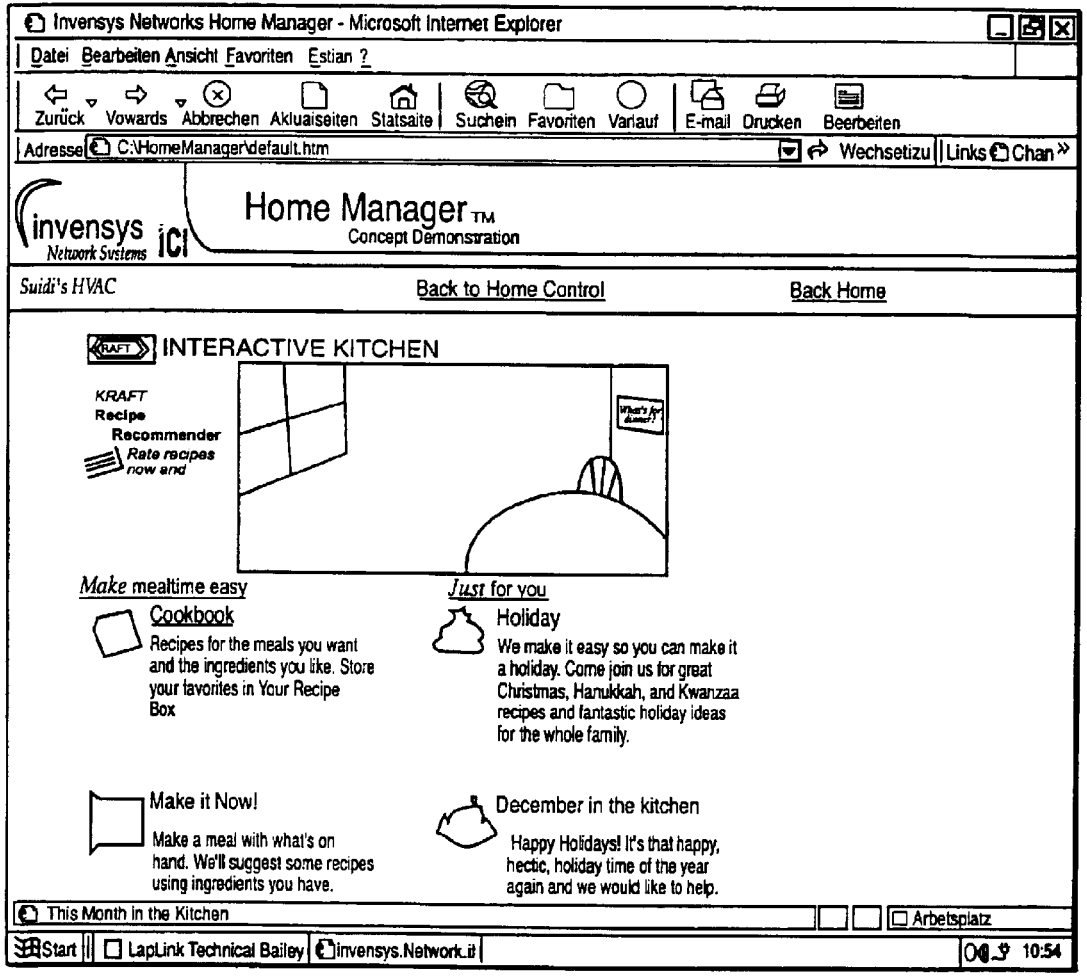
FIG. 14 is a screen shot of the home manager kitchen assistant of the software of FIG. 12.

The kitchen and laundry assistant centers around maintaining an inventory of products in the home such as food and laundry supplies. The assistant maintains shopping lists and supports e-grocery and e-commerce. A method for scanning products, such as barcode or RF ID, is supported to introduce new products into inventory and remove them when discarded. Discarding or use of an item can automatically prompt e-commerce services for re-stocking. The kitchen assistant focuses on meal preparation by recommending recipes or compliments based on products in inventory. The kitchen assistant also supports recipe instructions accessed from Internet sites. A screen shot of the cooking assistant is shown in FIG. 14.

Home Automation

The home automation feature consists of a variety of modes that can be invoked from the stay mode, the bedtime mode, or the sleep mode. This feature consists of settings for groups of devices associated with certain activities. There are a number of default modes plus a set of user defined modes provided by this feature referred to as activity modes. Default activity modes include: television, reading, dinner, formal dinner, and party. The homeowner can add activity modes, such as, for example, gaming, for playing cards, or night swim, to turn on back yard lights.

BC Systems

Meter Network

Figure 15:
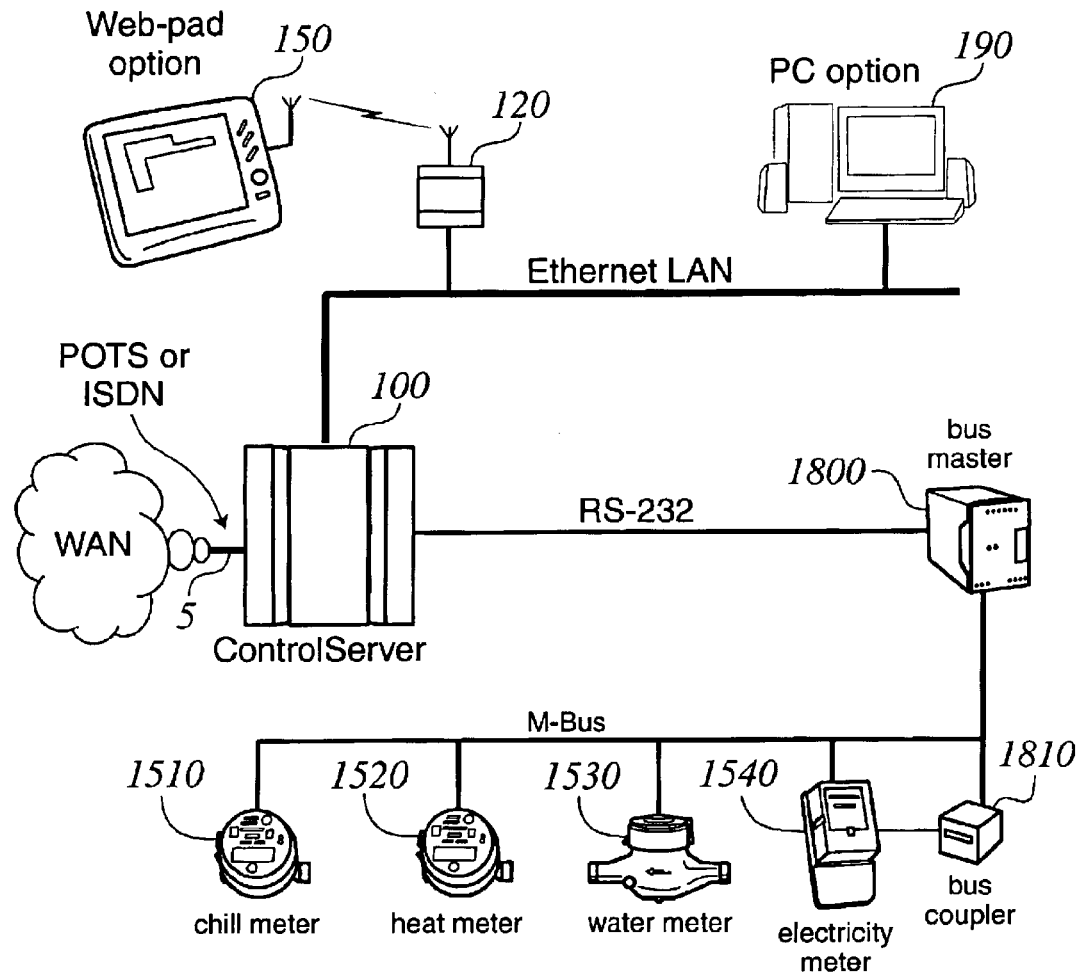
FIG. 15 is a block diagram of a metering network.

The meter network and its link to the control server is explained with reference to FIG. 15. Water meter 1510 and heat meters (1520,1530) are connected with a bus 1501 output that allows the meters to be networked via Cat5 cable to a bus master unit 1500. The bus master unit 1500 converts the bus signals to a format readable by the control server 100. The electricity meter 1540 has a pulse output that requires an additional bus coupler 1510. The bus coupler 1510 accumulates the pulses and allows connection to the bus 1501. Each coupler has pulse inputs for up to 4 meters. The bus 1501 has an open protocol such that any product that conforms to bus standards can be connected to the network.

Ideally the bus master unit 1500 is located in the same position within the house as the control server 100 and connects to the control server 100 through one of the control server's RS-232 ports.

The control server 100 allows each meter to be read by an authorised external data collection service. As a result, a wide variety of monitoring services can be offered, such as, for example, data collection, data analysis, and payment. Such services benefit the end-user through improved visibility of energy usage leading to better energy management. The home manager software can display energy consumption data and trends and to give tips for reducing consumption.

Figure 16:
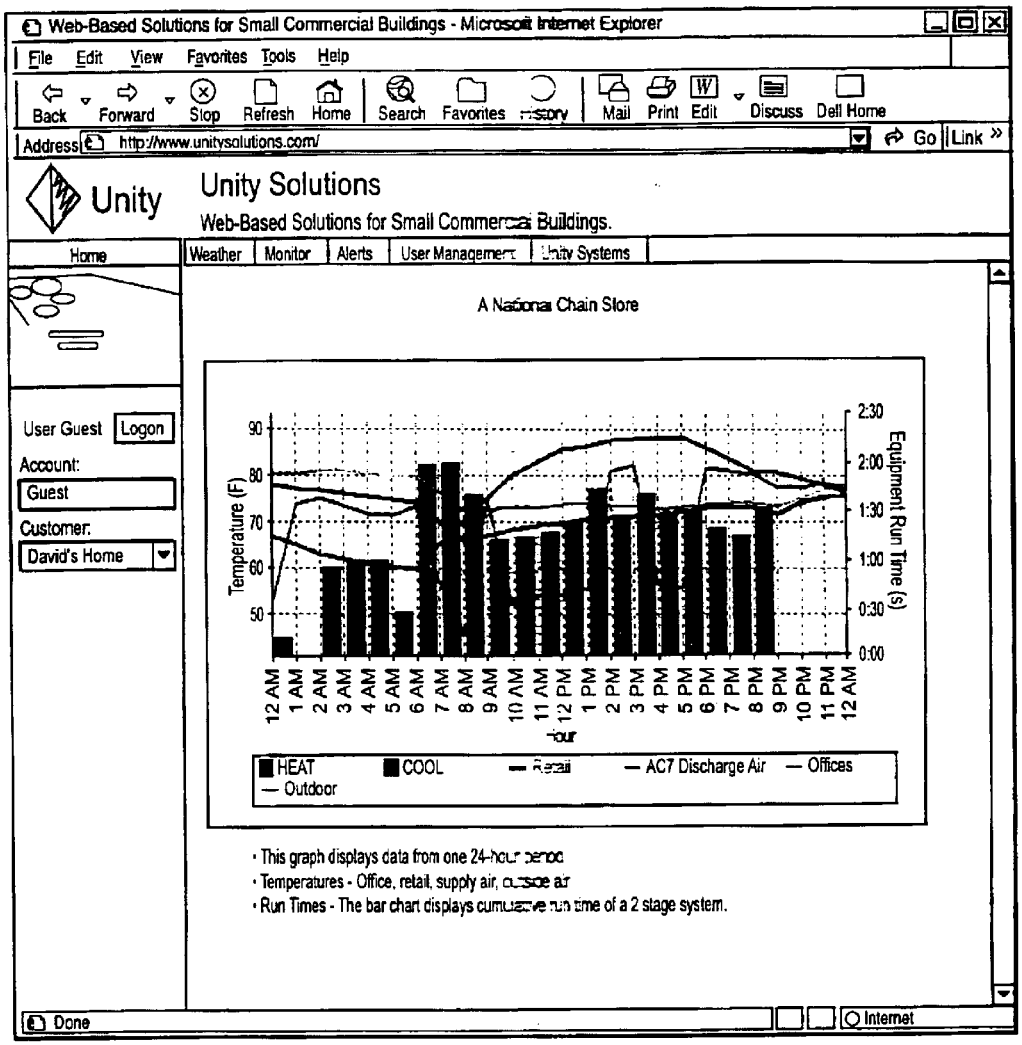
FIG. 16 is a screen shot of a remote monitoring service.

Energy DataVision (EDV) is an online data display package that enables energy users to monitor energy usage patterns via the web. IMServ's data collection service arm remotely interrogates metes to access meter reads. Each meter has an identification number assigned to it. The monitoring services is given an access code to log into the control server 100 and use the EDV system to create a variety of reports regarding energy usage for the building. EDV can graph usage trends from month-to-month, day-to-day, date-to-date, hour-to-hour. An example of an EDV screen shot is shown in FIG. 16.

Figure 17:
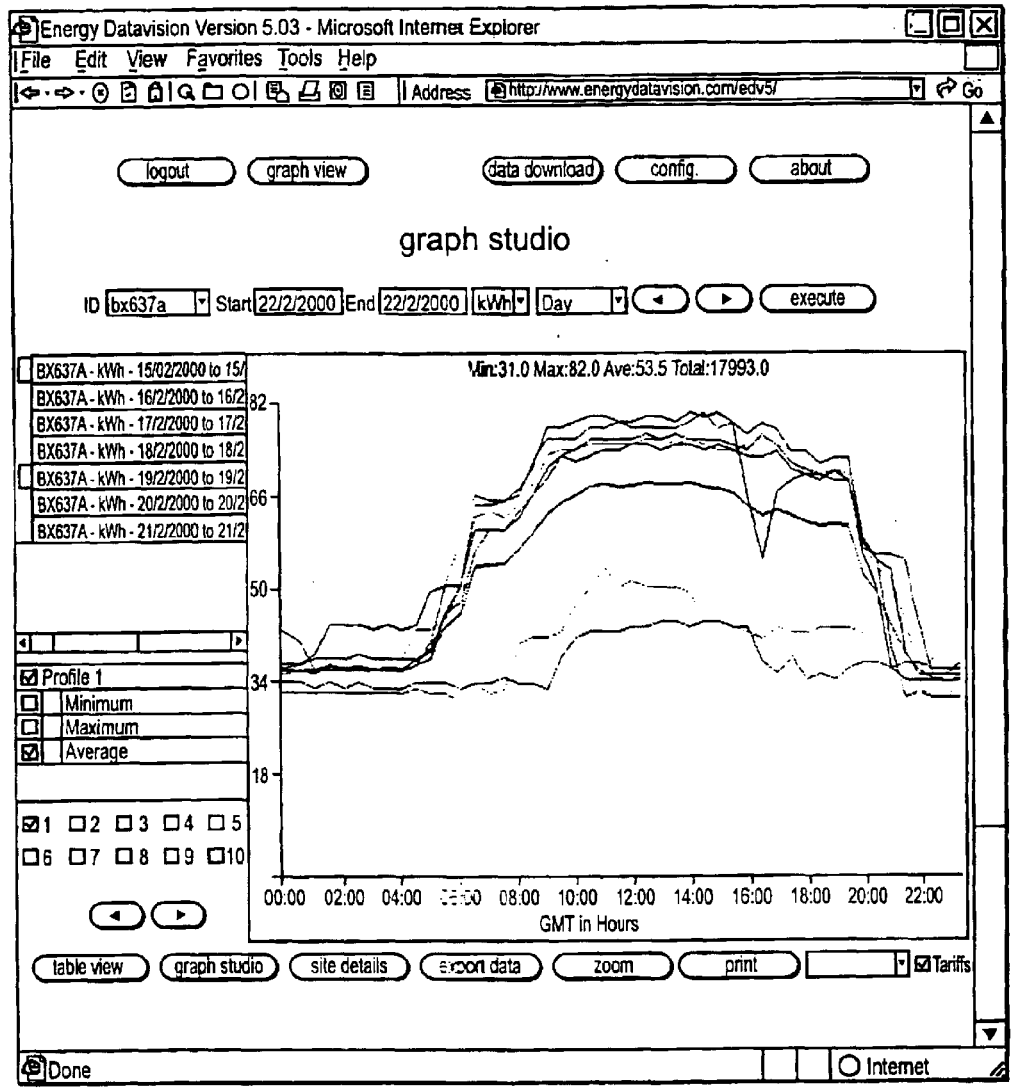
FIG. 17 is a screen shot of a temperature monitoring interface.

Commercial diagnosis analysis is shown in FIG. 17.

Central Locking and Door Access System

Figure 18:
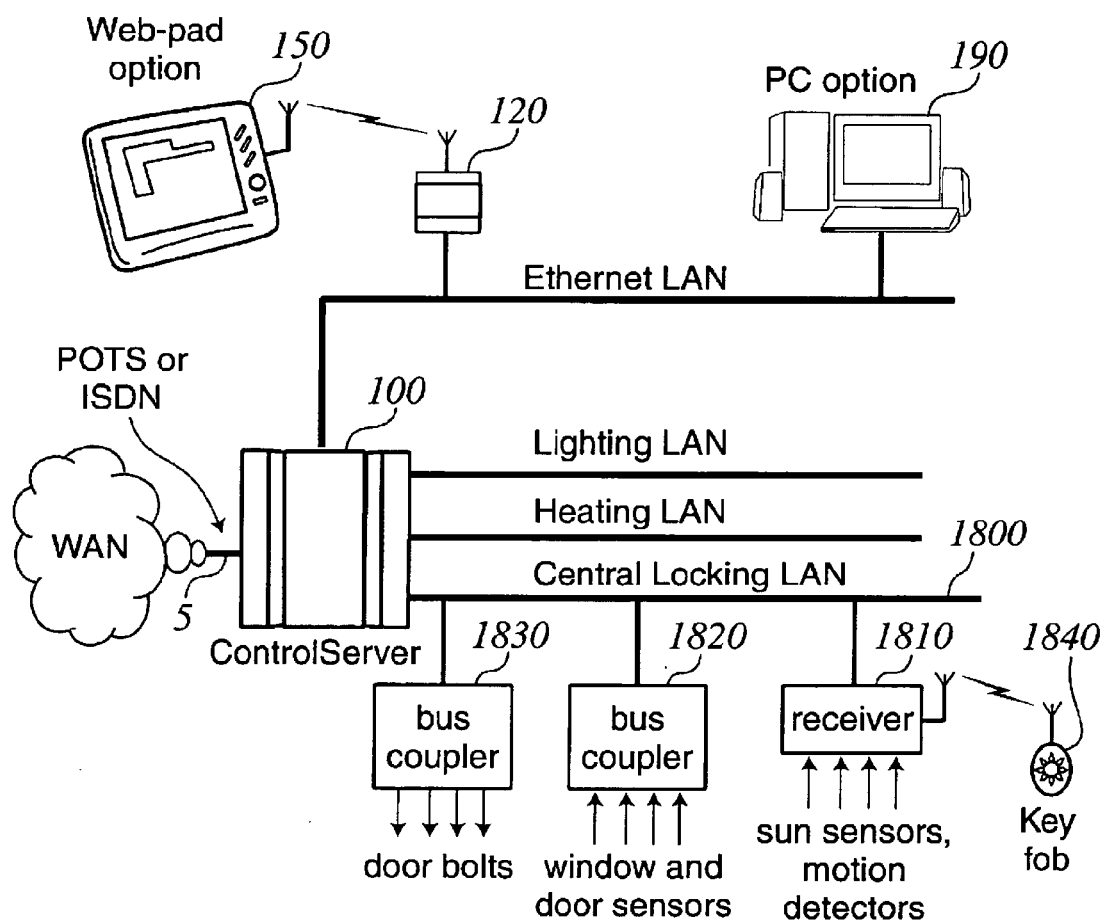
FIG. 18 is a block diagram of a central locking network.

The central locking system, shown in FIG. 18, includes an RF key fob 1040, a receiver 1810, a motorized door bolt, and sensors to detect an open/closed door, door bolt position, and open/closed windows. A bus coupler 1830 is provided for connection to the motorized door bolt. The motorized door bolt is activated and deactivated using the key fob 1840. The key fob 1840 transmits a lock signal and an unlock signal to the RF receiver 1810. The RF receiver relays the signals to the control server 100 to control one or more motorized door bolts. The motorized door bolts also can be controlled using other BC system interfaces, such as, for example, a portable tablet 150 (through control module 120), a PC interface 190, or through the Internet portal 5. A second bus coupler 1820 provides inputs from the widow and door sensors to the control server 100 indicating an open/closed state of the doors and windows.

The control server 100 can interface with an existing door access system by using one of the bus coupler outputs to trigger the door controller (i.e., the opening/closing mechanism). The central locking system allows the user to check that all windows and doors are in the correct position before automatically locking them. The same key fob 1840 can be used with the door access system to open the common access door either from inside or outside the building. This reduces the number of keys that need to be used in any one location.

The key fob technology ensures security by appropriate coding. More than one key fob can be accommodated to allow each family member to have his or her own key. On activating the close function from the key fob, the control server 100 checks that all doors and windows connected to the system are closed. A warning is given (e.g., by continually flashing the door/hall lights) if the all sensors do not detect a closed position. If all doors and windows are closed, the system activates the locks. After the locks have been activated another check is performed and if all doors have successfully locked and indication is given (e.g., flashing the door/hall light once).

In the event of a power failure, the doors remain secure but in the event of a fire or other emergency they are easily opened from the inside and do not impede an escape route.

The home manager software for the control server 100 can include the central locking features.

House Security System

Figure 19:
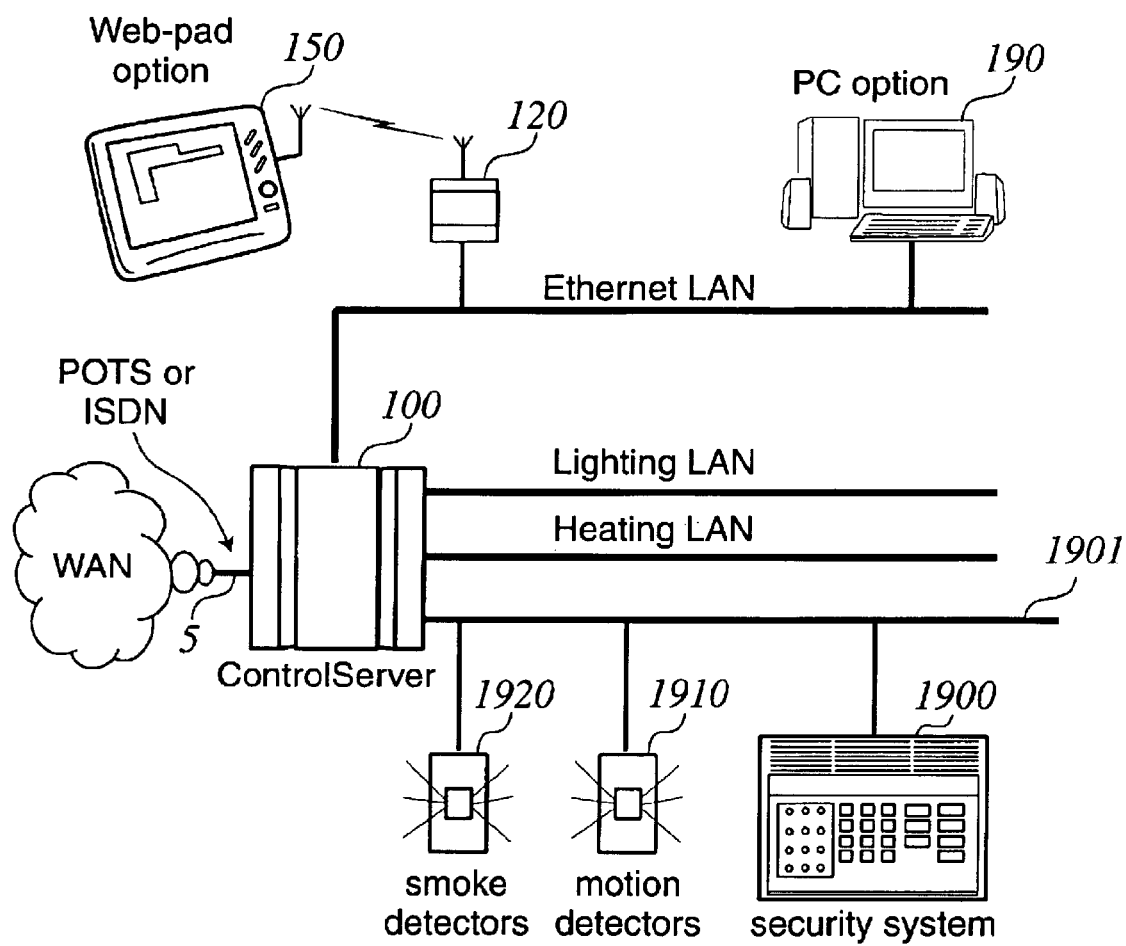
FIG. 19 is a block diagram of a security network.

A home security network is shown in FIG. 19. The required sensors can be hardwired to an existing electronic security system 1900. The exisiting security system 1900 is linked into the control server 100 through a serial link 1901. Alternatively, RF controlled motion detectors 1900 and smoke detectors 1920 can send signals to the control server 100 for analysis. The control server 100 provides telephone connection and web services that are need for the security system. The status of the security system can be monitored by a remote server using the Internet portal 5, dedicated ISDN, DSL, or POTS service, or any of the home interfaces, such as portable tablet 150 or PC interface 190.

The existing network can be extended by adding the sensors to the appropriate LAN. In this case, the home manager software can be customized to provide specific system features tailored to the location. The security system using the control server 100 can perform all standard functions such as intruder alarm (through door and window switches or motion detectors) and alarm generation (either locally or remotely).

Lighting System

Figure 20:
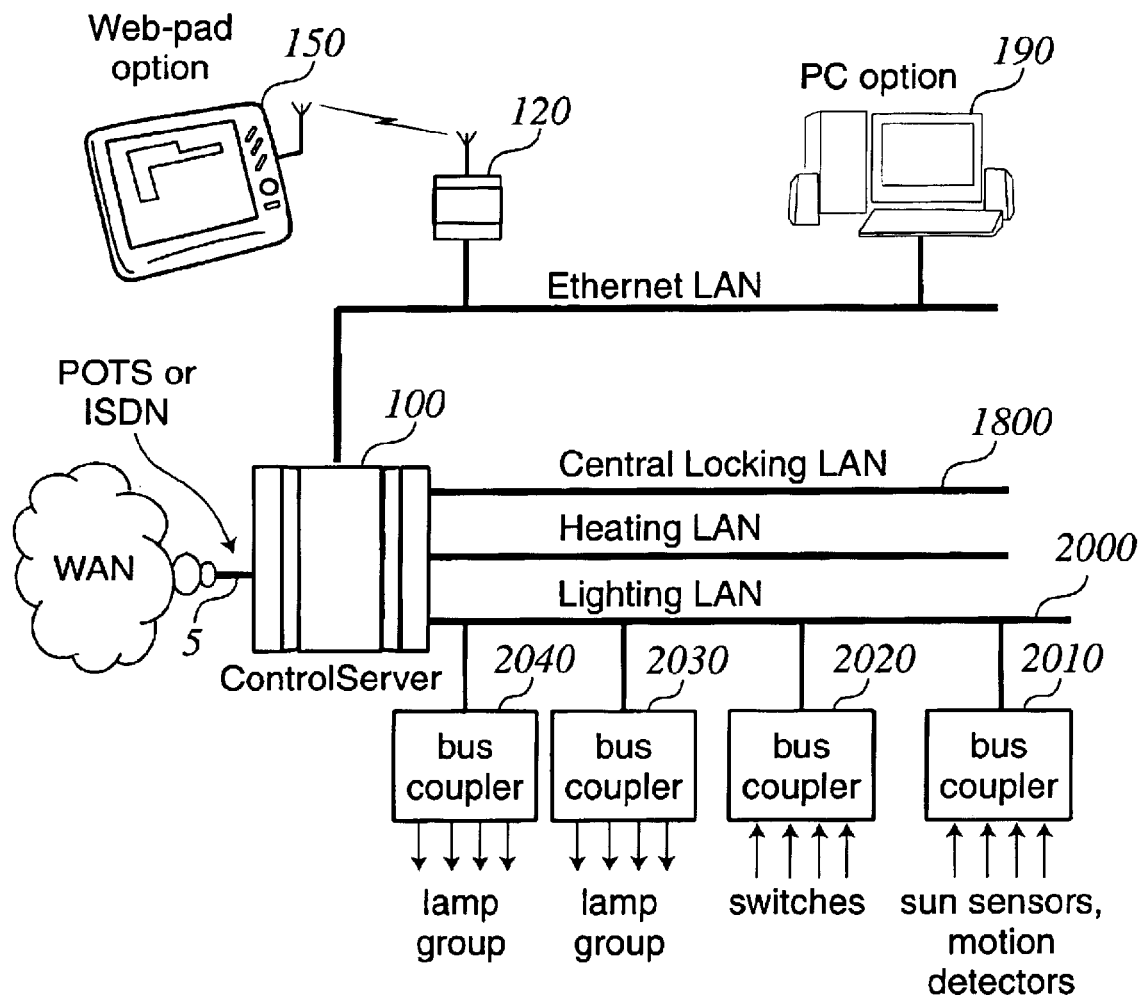
FIG. 20 is a block diagram of a lighting network.

A lighting network for use with the BC system is shown in FIG. 20. The lighting network comprises a lighting system LAN 2000. A number of bus couplers are connected to the lighting system LAN 2000. Each bus coupler is directly wired to a number of lamps, switches, or sensors. For example, bus couplers 2030 and 2040 are each dedicated to a lamp group, bus coupler 2020 receives signals from a number of switches, and bus couple 2010 receives inputs from sensors (e.g., motion and sun detectors). The bus couplers can be mounted in an electrical distribution box with the loads and inputs connected through a conventional mains cable.

The lighting system LAN 2000 can be implemented using an EIB or other LAN. The EIB LAN uses a bus converter to connect the LAN to the control server 100 using an available RS-232 port of the control server 100. The lighting network can operate even if the control server 100 has a failure. However, interaction with other systems, such as central locking or security, would not be available. A networked lighting system offers flexibility that allows the relationship between switch and lamp be changed simply by re-configuring the system. In addition, lamps, switches, and sensors attached to the lighting LAN 2000 can be shared and controlled by other systems connected to the control server 100. For example, the central locking system can put the house into standby mode when closed ensuring that no lights are left on when the house is empty. A light sensor can be used to detect sun rise and sun set so that the control server 100 can control the lights in a way to simulate occupation. Optionally, motion sensors can be used to switch lights off when a room is unoccupied or to switch them on when someone enters.

The lights also can be controlled using any of the BC system interfaces, such as, for example, PC 190, portable tablet 150 or through a remote interface connected through Internet portal 5.

Temperature Control System

Figure 21:
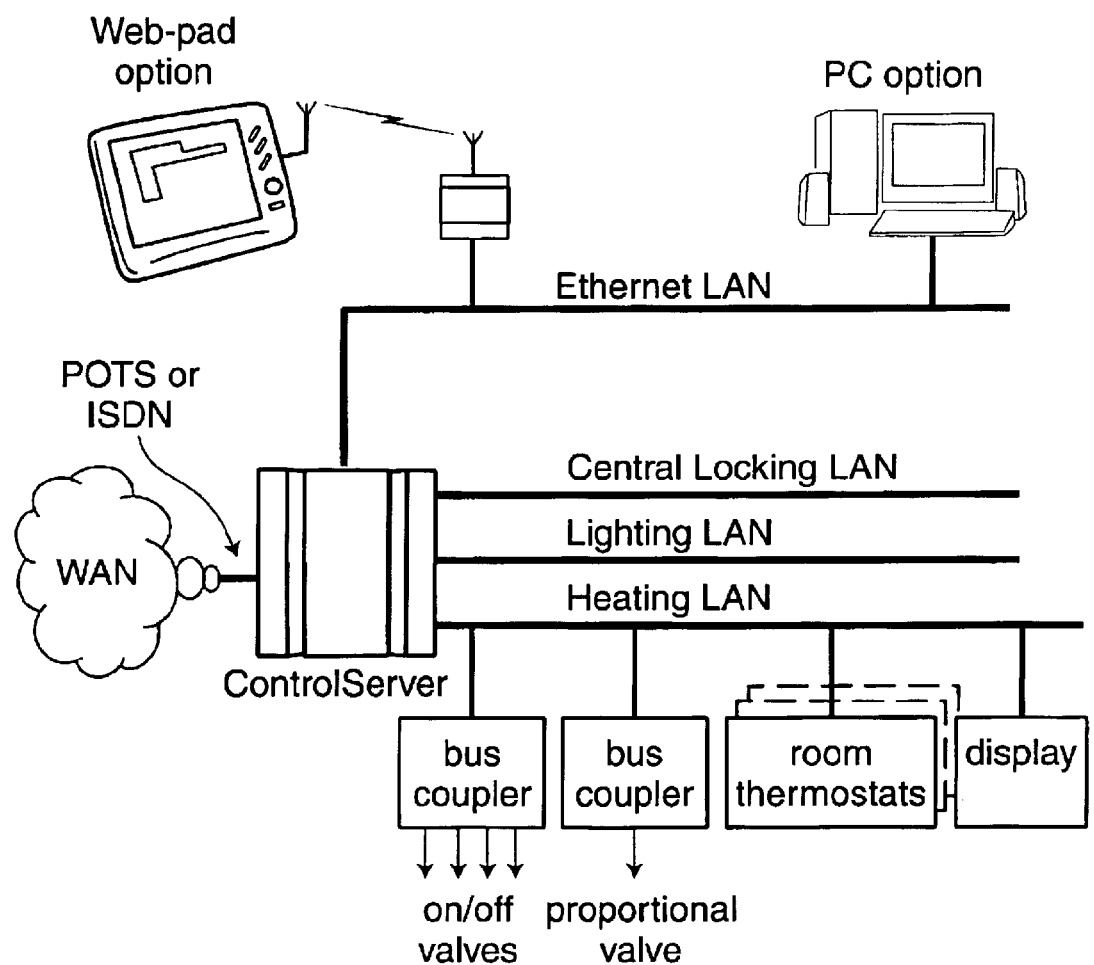
FIG. 21 is a block diagram of a heating network.
Figure 22:
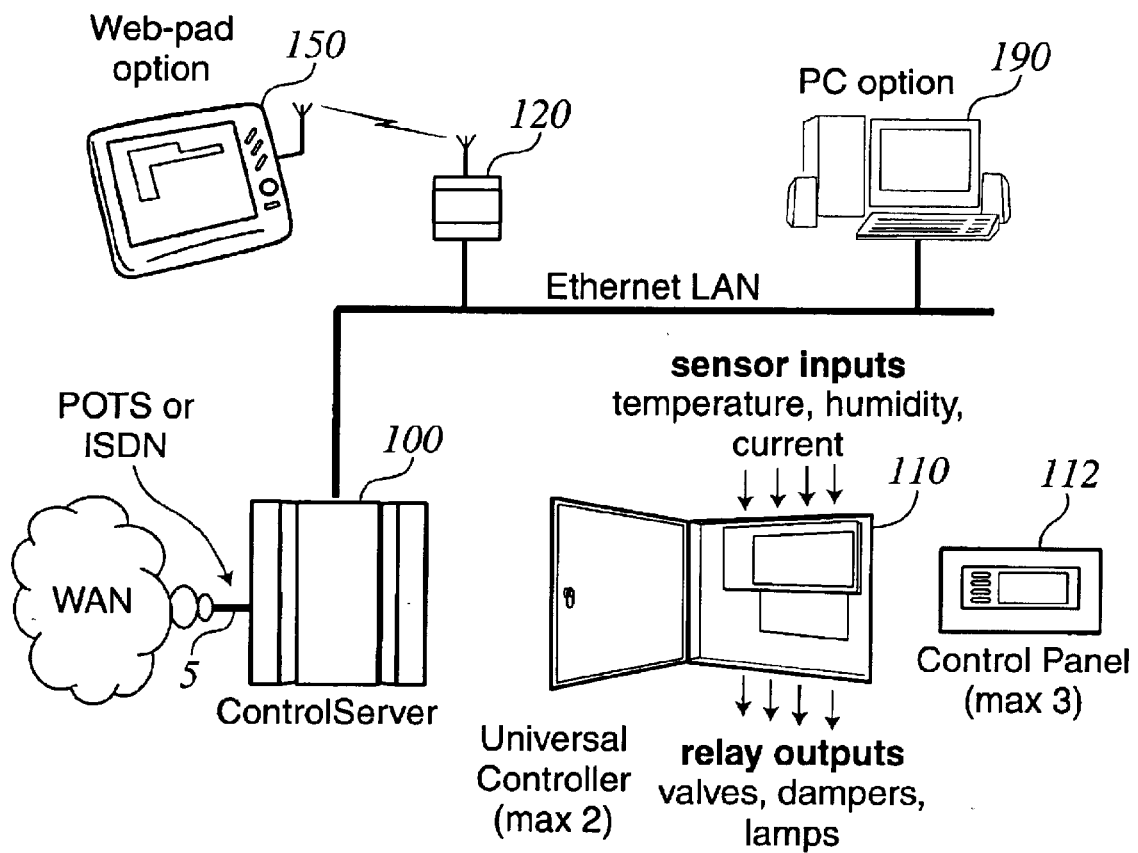
FIG. 22 is a block diagram of a zone controller and a heating network.

A temperature control system is shown in FIG. 21. A heating LAN (e.g., an EIB LAN) can be used to control the temperature of rooms and provide zone control. The heating LAN connects the control server 100 to control valves, to room thermostats, and to room displays through a number of bus connectors. Alternatively, the heating LAN can be controlled by a universal controller 110 or a zone control 133 under supervision of the control server 100 (as described in the next section). As shown in FIG. 21, the control server 10 communicates with room thermostats through the heating LAN while bus couplers drive on/off valves, proportional valves, and dampers. Alternatively, RF controlled dampers and thermostats can be used as described above with regard to FIGS. 9–11.

Linking the heating LAN to the control server 100 gives access to the other systems so that, for example, the central locking system could put the heating system into standby mode when the house is locked. The window sensors used either by a central locking system or a security system can be used by the heating system to turn off room radiators when a window in the corresponding room is open for longer than a certain period of time.

A network of thermostats and valves allows a comprehensive software user interface offered by the home manager to effectuate zone and profile control.

Zone and Profile Temperature Control System

The universal controller 110 offers a very flexible temperature control system that can be linked to the control server 100. An LCD touch-pad 112 gives the user access to the system for changing temperatures, times, and other system management functions. The universal controller 110 is designed for mounting in an electrical distribution box. The box can be placed adjacent to the control server 100 or close to the valve/damper array for the heating system. The universal controller 110 links to the control server 100 using an RS-485 network interface.

The control panel 112 is wall mounted and connects to the universal controller through three sets of twisted-pair wires. Each universal controller 110 has up to 16 configurable analogue/digital inputs and twelve configurable relays output pairs. To add additional inputs and outputs a second universal controller 110 can be networked into the system. Up to three control panels can be placed at different positions around the home. An additional power supply allows two more control panels to be added if desired.

Once installed, the universal controller 110 needs to be configured. Configuration should be carried out by trained personnel using a PC running configuration software. The temperature control system allows up to 16 zones for either heating or cooling systems or 10 zones for combined heating and cooling. For example, each room in the house could be configured as a single zone. A temperature sensor in each room allows the user to set the required temperature and control the temperature controlling a valve/register to the room radiator feed or air damper. For combined heating and cooling systems, a valve is added to control the fan coil feed.

Each zone is programmed with a profile of temperatures by day of the week and time of day. As a result, only those rooms, which are normally occupied at particular times or days need be heated or cooled. The control panel 112 allows the user to over-ride these profiles at a given time. The profiles can also be over-ridden by the control server 100 so that, for example, the heating system can be turned down if the central locking system reports that the house is locked and unoccupied. An outside air temperature sensor can be added to allow improved temperature control algorithms that account for ambient weather and temperature conditions.

The universal controller 110 can interface directly with a fire alarm system or individual smoke detectors allowing the universal controller to close all dampers and turn of the boiler and air circulating fan upon detection of a fire.

A wide variety of other sensors can be added to complement the functions offered by the system. For example, CO, $CO_2$, flammable gas sensors could also be incorporated for home safety.

Figure 23:
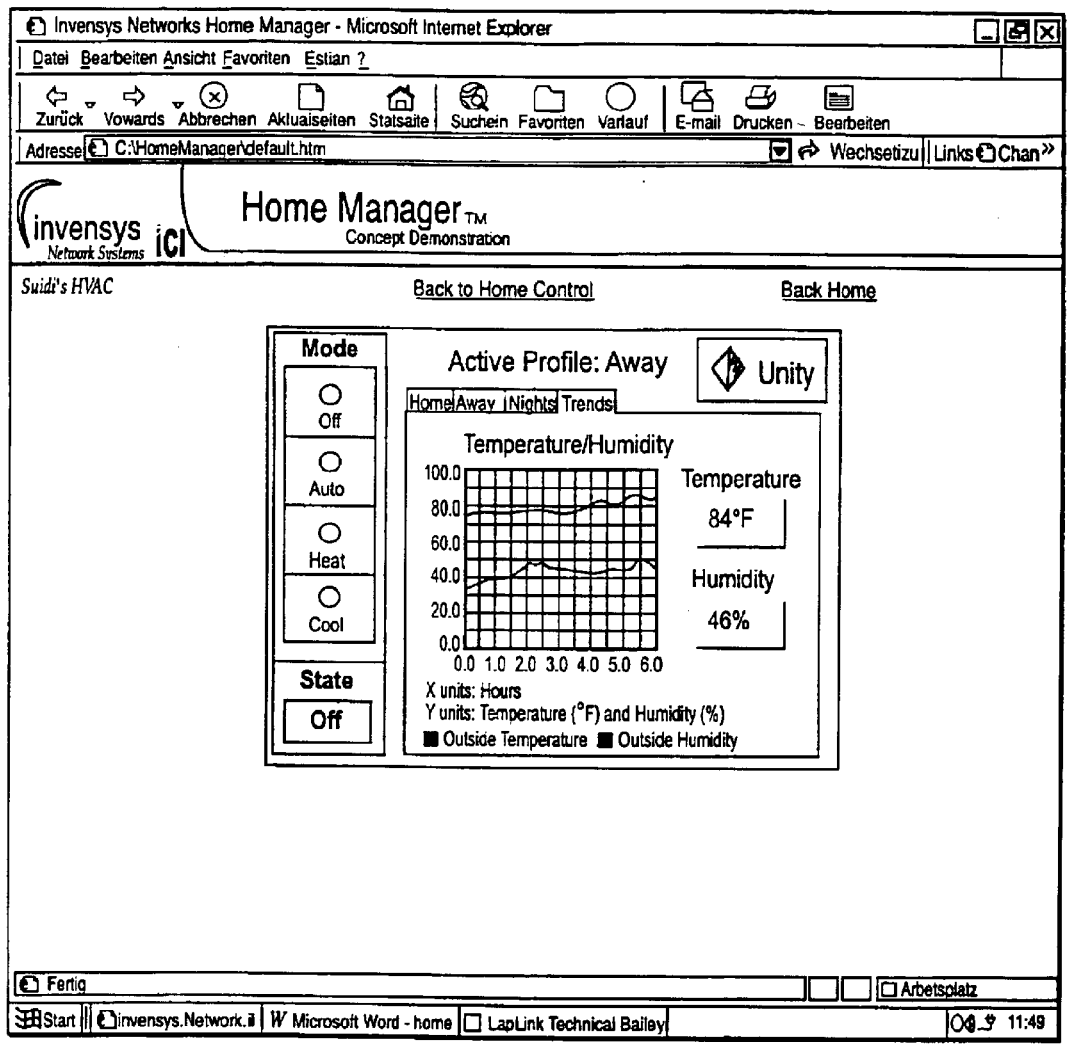
FIG. 23 is a screen shot of a home manager heating control interface.

The universal controller 110 has a monitor function that allows current status of all connected devices to be viewed. The monitor function can be made available to the control server 100 and to any user interface (e.g., 150 or 190) connected to the control server 100, including a telephone connection. The home manager software can deliver a java file that is displayed using browser software on a local PC 190, or over a remote connection using Internet portal 5. An example of a screen shot for control of the HVAC is shown in FIG. 23.

Networked Appliances

Figure 24:
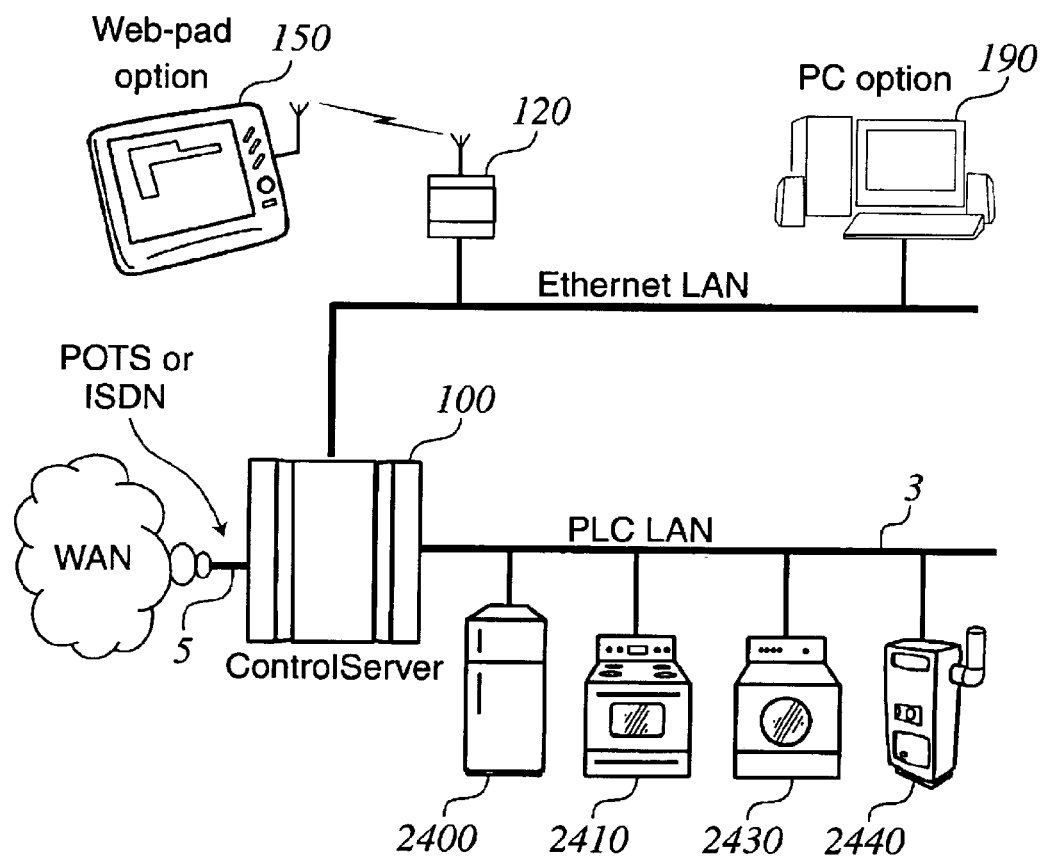
FIG. 24 is a block diagram of an appliance control system.

An appliance network is shown in FIG. 24. The networked appliances can communicate with the control server 100 using PLC LAN 3. An appliance is networked simply by plugging the appliance into the wall outlet connecting the appliance to the control server 100 through the PLC network. As a result, no additional wiring or re-configuring is necessary each time an appliance is installed or reconfigured.

Connecting appliances to the control server 100 provides a number of benefits due to the sharing of data with other networked devices and the connection to external service monitoring companies through a phone line or Internet connection.

Figure 25:
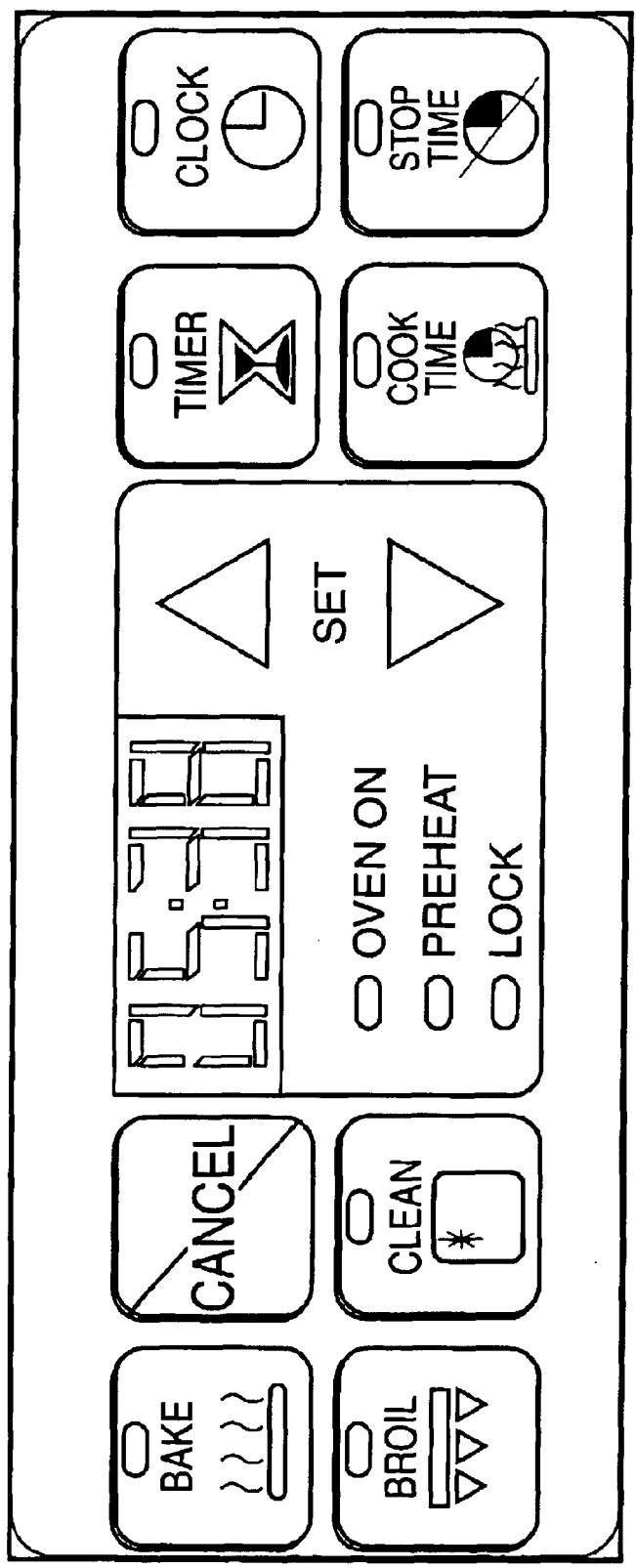
FIG. 25 is a screen shot of an exemplary virtual control panel of the system of FIG. 24.

The home manager software is able to display virtual control panels for each appliance as shown in FIG. 25. As a result, the appliance can be controlled remotely under the supervision and monitoring of a portable web pad 150 within the home, or from a remote location using the Internet portal 5. When combined with the AvCast option, the home manager pages can be displayed on the TV screens in the home. As a result, during advertisements, for example the user can switch to the oven channel to see how the roast is doing. The appliance's virtual control panel has the same appearance as the physical controls panel on the appliance.

Service companies can offer remote monitoring facilities to reduce the cost of repairs enabling them to offer extended warranty coverage for all such connected appliances.

Interactive Marketing

According to another aspect of the BC system, users' actions may be monitored in order to provide better service to the users of the BC system. The BC system allows consumer and commercial marketing companies, for example, to understand what the users are doing in their homes at all times. An advantage of using the BC system to monitor consumer activity, is that the user is not required to fill out surveys, report data manually, or otherwise change patterns of daily behavior in order to permit the collection of data. In addition, the BC system allows diagnostic information to be gathered to improve operation of system components and build infrastructure systems within the premises.

Through use of the control server, communication modules, and monitoring components, such as a smart module or retrofit plug, data can be sent using the Internet portal, to service provider for monitoring and analysis. Using the diagnostic components of the system, the monitoring company can monitor use of appliances, systems, and components within the home to determine exactly what activities are being performed by each appliance, including the exact time the appliances were used and the duration of the use. For example, a networked washer and dryer can be monitored by a service provider to determine what cycle the washer is in. When the cycle is finished the washer display or user interface, for example portable tablet can display a coupon for detergent, fabric softener, or anti-static dryer towels. If the appliance malfunctions, the control server can turn off the appliance before permanent harm is done and send a message to the user service provider that repair is required. In response, the service provider can supply instruction to the user for simple repairs that do not require a technician's assistance. In addition, merchants can monitor the appliance's usage in order to provide better warrantees that are based on the specific customer's actual usage.

RF tags can be used to improve appliance performance. For example, RF tags can be included in clothing so that the appliance informs the user when clothes do not match the selected cycle. Coupons or and advertisement can be displayed for the type of clothes washed. For example, if delicates are being washed, a coupon for Woolite can be displayed. The advantage of the BC system over prior couponing systems is that the coupons can be displayed to the user when the user can take advantage of the coupon. Additionally, food RF tags can be monitored by control server to remind the user that certain food items are running low or are soon to expire or should be disposed of. At the same time, coupons can be sent and displayed to user of those items. Alternatively, a shopping list can be automatically generated and sent to a shopping delivery service so that the user does not even have to order or shop for designated items.

TV Channel Recorder

Techniques may be used to map the time of programming watched to identify exactly what the television was tuned to at any particular time. Because of the ability to catalog time and tuning the data logged by the control server 100, market researchers can determine what was being display based on the channel, location, and time. With this information, market researchers can precisely determined what information was displayed on the TV and determine specific viewing habits of a household. If personal RF tags, key fobs, or remote controls are also used then the control server 100 also can identify who was in the room when the TV was tuned to the channel and determine who was viewing a program or commercial.

Furthermore, the action of the TV channel recorder can be combined with an Internet activity recorder designed to monitor web surfing habits and PC usage habits. These features allow performance of web usage monitors of a nature substantially the same as the well known TV usage monitoring services, such as, for example, ACNeilsen performs, but without intrusive use of logs or manual methods. It is even possible to link radio monitoring through a suitably adapted radio. The combination of TV monitoring, radio and/or PC usage monitoring, and in-home activity monitoring permits unsurpassed analysis of a household's economic activities. Prior to this, TV, PC, and home activity monitors were applied independently to various homes and statistical methods were used in an attempt to extrapolate the observed results to all homes of particular econometric groups.

No holistic, whole household view was possible because of the intense intrusion that the manual log methods imposed on a given household. A complete 360° view of household activity is possible (with permission from the household) with the BC system. The integrated data from the BC system capture all of the media influences being presented in electronic form. As a result, more sophisticated statistical analysis of household response to the media influences presented is permitted. True cause and effect analysis of advertising effectiveness can be performed, which are far superior to current methods.

In the final case, store point of sale data from participating local stores or RF tag data from tags attached to purchased goods or bar codes scanned from purchased goods can be used to close the loop on media influence measurement. Goods can be test marketed using various forms of promotion, including electronic and print media known to have been sent to a household, known to have been viewed, surfed or listened by particular household members engaged in known activities at known times and the resulting effectiveness measured with unparalleled accuracy without the distorted effect of requiring manual logs of activities to be kept by the household participants.

Retrofit Refrigeration Monitoring Unit

Figure 26A:
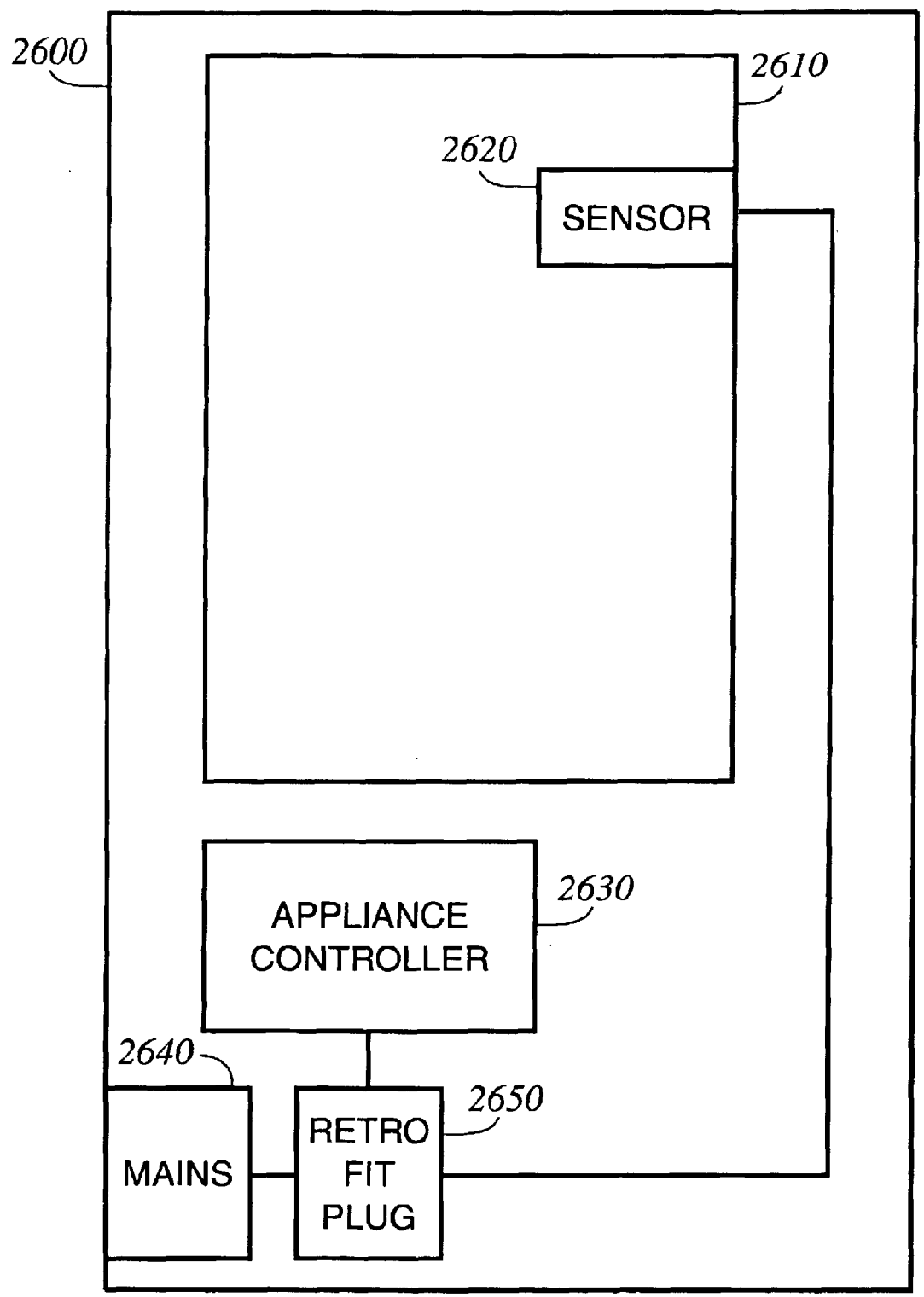
FIGS. 26A and 26B are block diagrams of a refrigeration monitoring unit.
Figure 26B:
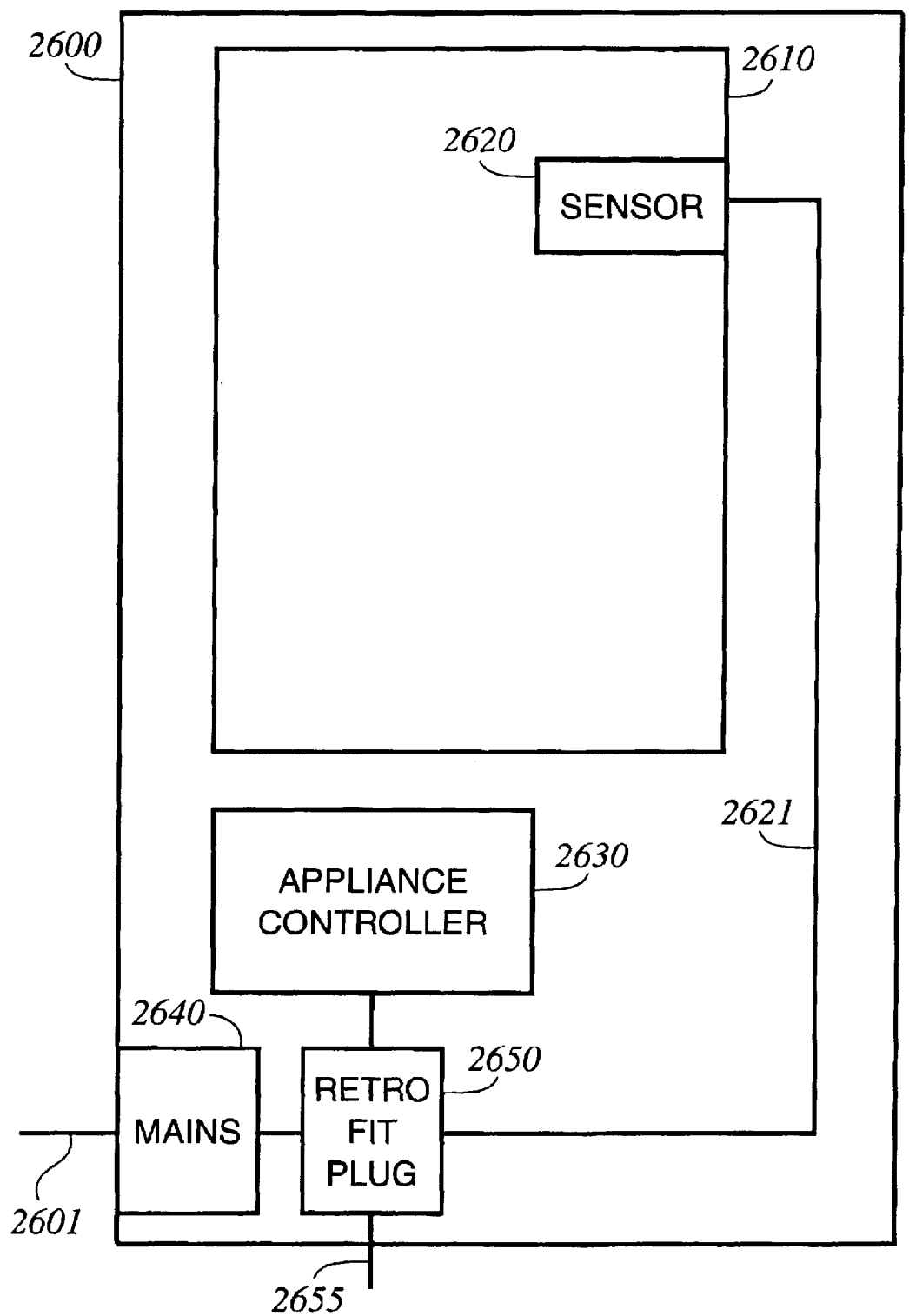

FIGS. 26A and 26B show a refrigeration monitoring system. As shown in FIG. 26A, a refrigeration appliance 2600, such as, for example, a refrigerator or freezer, can be retrofit to monitor for food properties, such as, for example, spoilage, and to alert the operator of the refrigeration appliance so that appropriate action can be taken, if necessary.

A refrigeration appliance 2600 can be retrofitted for monitoring by adding a retrofit plug 2650 (described above) to allow the appliance to communicate with a remotely located computer, such as, for example, a control server 100, a gateway, or a building monitoring service. The retrofit plug 2650 includes an alternative power source, such as a battery, that allows the plug to operate in the event of a power failure or outage at the location of the refrigeration appliance 2600. An LED indicator can be included on the outside of the retrofit plug 2650 to indicate a battery low condition. The retrofit plug 2650 also can monitor the power level of the battery and signal a monitoring service or user when the battery should be changed.

The refrigeration appliance 2600 includes a compartment 2610, such as, for example, a freezer or a refrigeration compartment. A sensor 2620 can be included or retrofitted to the refrigeration appliance 2600. The sensor 2620 can be retrofitted by drilling a hole in the appliance 2600 to allow placement of the sensor 2620, such as a thermistor or another temperature-sensing device, inside the compartment 2610. A special seal or ring (sized to the hole and including insulation characteristics) can be inserted in the hole to act as an anchor for the sensor 2620. A cable or interface connection 2621 couples the sensor 2620 to the retrofit plug 2650. The retrofit plug 2650 includes a serial or other port to accept the interface connection 2621. The sensor 2620 provides data on the sensed condition within the compartment 2610, for example, temperature, to allow the retrofit plug 2650 to monitor conditions within the refrigeration appliance 2600.

The retrofit plug 2650 can process the sensed condition and perform analysis of the data. In one example, the plug can be programmed to calculate the speed at which temperature is rising in the appliance to determine how long it will be until food spoilage occurs. This information can then be provided to a user or monitoring service so that appropriate action can be taken. Alternatively, the sensed data can be sent to a control server 100, a gateway, or a monitoring service to perform the analysis function. Temperature measurements can be taken in real time or at intervals designated by the user.

The retrofit plug 2650 can be installed by connecting the retrofit plug 2650 to the main power supply 2640 of the appliance controller 2630. During normal operation, the retrofit plug 2650 can use PLC communication to provide data about the refrigeration appliance. Alternatively, other communications interfaces can be used. The retrofit plug 2650 also may include a communications circuit implemented by a modem or a RF communication device. In the case of a modem, a phone jack and a communications port 2655 are provided as shown in FIG. 26B. In the event of a power failure, the retrofit plug 2650 can alert a user or monitoring service that power is out. The retrofit plug 2650 also may dial a repair service if it is determined that there is a malfunction within the refrigeration appliance 2600. The retrofit plug also monitors the temperature within compartment 2610 and can provide an estimation of how long until food spoilage occurs. The estimate can be updated if sensed conditions within the compartment 2610 change. The retrofit plug 2650 also can perform other analyses. For example, if it is determined that the compressor is on longer than expected, combined with a rising temperature in the compartment, the retrofit plug may determine that a door open condition has occurred and may provide a message to the user or monitoring service of the open door condition.

Even if power is not lost, if the compartment 2610 reaches a predetermined temperature, the retrofit plug 2650 may perform certain actions. For example, the retrofit plug 2650 may call using the modem, or transmit using the RF device, a monitoring service, the operator of the device, or a controller, such as a control server, to indicate that food spoilage is immanent or how long until spoilage will occur. Alternatively, a repair service can be contacted to fix the problem associated with the refrigeration appliance. The retrofit plug itself, as described above, can supply diagnostic data to aid in repair of the appliance, if necessary. In this way, food can be monitored and spoilage prevented to save an operator the cost of replacing the food. In addition, liability issues can be reduced by keeping records that although power was lost, or the refrigeration appliance malfunctioned, food temperature was maintained at an adequate level such that spoilage did not occur. The retrofit plug 2650 may simply provide the temperature or other power monitoring data to a control server, gateway, or monitoring service, which can perform analysis of the data and determine if any action is necessary. For example, if used in conjunction with the control server 100, a message can be displayed on a user interface that the freezer is not working, the door has been left open, or that a repair service should be called.

Figure 27A:
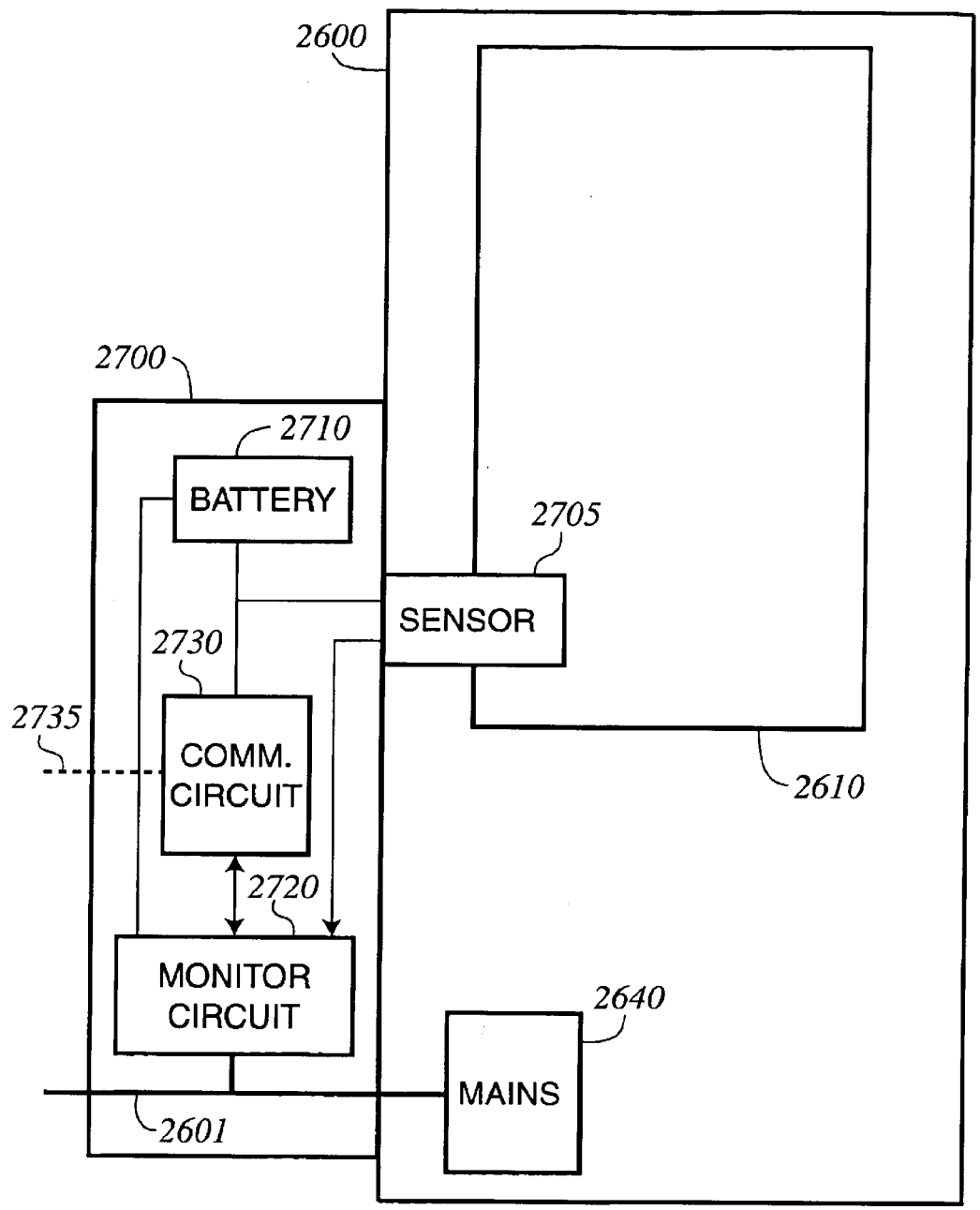
FIGS. 27A and 27B are block diagrams of a refrigeration monitoring unit.

As shown in FIG. 27A, in place of a retrofit a plug, a box 2700 can attach to the outside of refrigeration appliance 2600 (or the compartment 2610). According to one implementation, the unit 2700 can be implemented using a communications module (described above). In the implementation shown in FIG. 27A, a hole is cut and the unit with sensor 2705 is inserted into the hole. A suitable seal is provided to ensure adequate refrigeration is maintained. The unit 2700 can use the seal to seat itself on the refrigeration appliance 2600. Other means of fastening, such as, for example, adhesive, bolts, or screws also can be used. The seal may be inserted in the hole or be provided as part of the unit 2700 and sensor 2705.

The unit 2700 attaches to a power line 2601 to provide power to all components of the unit 2700. In addition, a back-up power source 2710, such as, for example, a battery is included to provide power in case of main power loss or outage. An external LED or some other indicator may be provided on the unit 2700 to alert the operator of a low battery condition.

A small processor or monitoring circuit 2720 monitors temperature inside the refrigeration appliance 2600. The monitor circuit 2720 is connected with a communications circuit 2730. The communications circuit 2730 can be implemented using, for example, a wireless transceiver, a wireless transmitter, or a modem. The communications circuit 2730 can include a phone jack for connection to a phone line 2735, if a modem is used. In the case of a temperature event, the unit 2700 is programmed (by external device such as a key pad with an interface, through the modem, or by insertion of a memory chip, such as a flash memory) with a number to call to alert an operator or monitoring company of the temperature or condition within the appliance, indicating that food spoilage will occur without intervention. Alternatively, if a wireless communication device is used, a message could be sent to a gateway, a control server, or a communication link to alert a user or monitoring service of the temperature event. The monitoring circuit 2730 also can be programmed to perform all of the monitoring function and analysis that is provided by the retrofit plug or communications module.

Figure 27B:
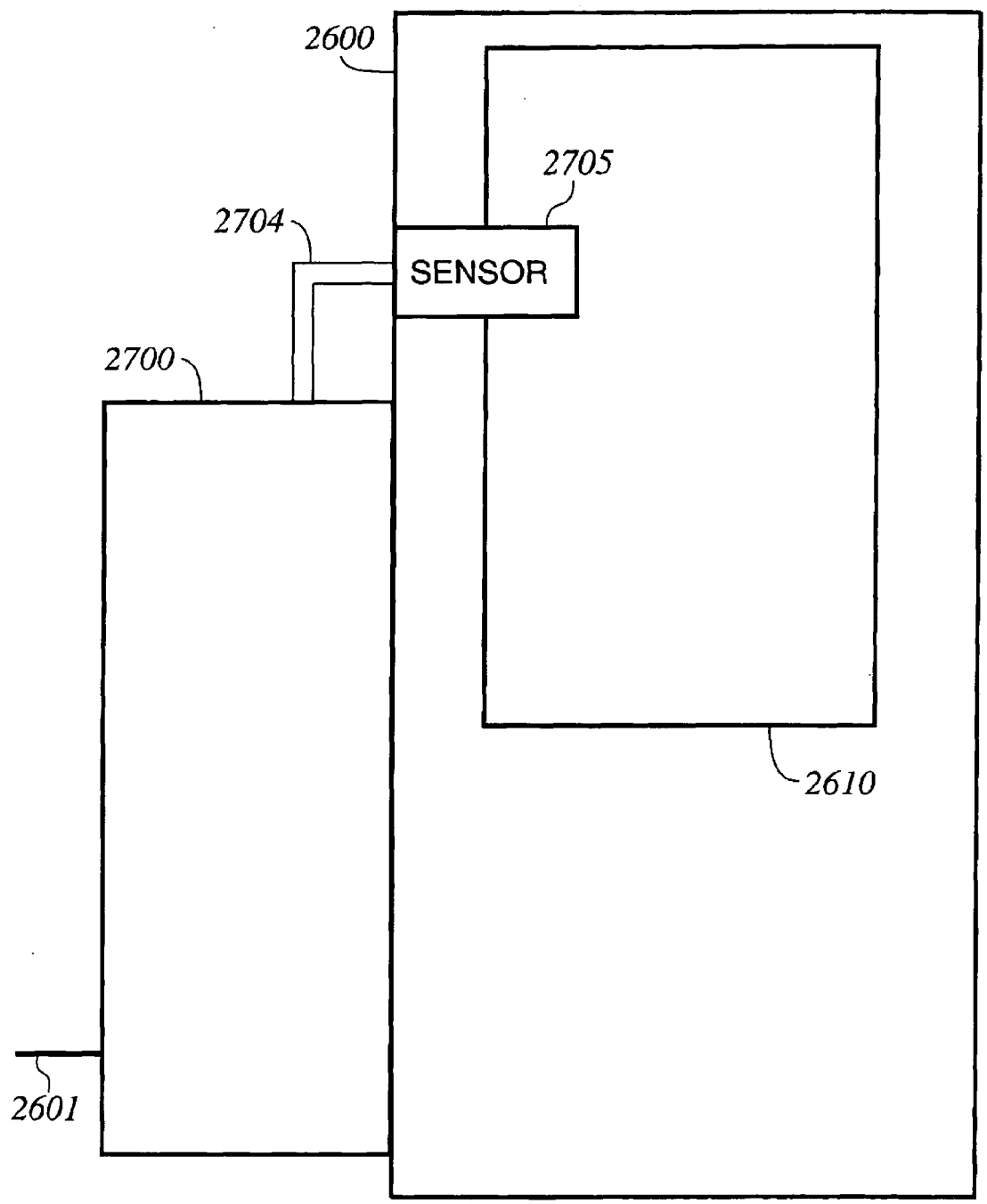

The sensor 2705 arid unit 2700 also can be implemented as separate units connected by a cord or other interface 2704 as shown in FIG. 27B. The unit 2700 can be mounted on the refrigeration appliance 2600 using an adhesive or using a form of attachment, such as, for example, screws, bolts, or other means of fastening.

A number of implementations have been described. Nevertheless, it will be understood that various modifications may be made. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A device for monitoring an appliance that receives power from a power source, the device comprising:

a first coupler that couples the device to the power source;

a second coupler that couples the device to the appliance;

a monitoring circuit connected between the first coupler and the second coupler to monitor power supplied by the source to the appliance, the monitoring circuit including a memory that stores an electronic signature of the appliance and a processor that determines an operating state of the appliance based on the electronic signature; and a communications circuit connected to the monitoring circuit, wherein the monitoring circuit provides data based on the monitored power to the communications circuit.

2. The device of claim 1 wherein communications circuit includes a receiver that receives a control signal from the first coupler to control the monitoring circuit.

3. The device of claim 1 wherein the communications circuit includes a transceiver that receives a signal from the first coupler to control the monitoring circuit and to transmit monitored power data.

4. The device of claim 1 wherein the communications circuit comprises a power line carrier transceiver and a power line driver coupled to the monitoring circuitry and the first coupler.

5. The device of claim 1 wherein the monitoring circuit measures current drawn by the appliance.

6. The device of claim 5 wherein the monitoring circuit includes a processor, that determines an operating state of the appliance based on the measured current.

7. The device of claim 5 wherein the monitoring circuit includes a memory that stores the measured current and periodically sends measured current data to the first coupler.

8. The device of claim 1 wherein the processor determines an operating state of the appliance and transmits the determined state to the first coupler.

9. The device of claim 1 further comprising a modem connected to the monitoring circuit for transmitting data based on the measured current.

10. The device of claim 1 further comprising a radio frequency transmitter connected to the monitoring circuit for transmitting data based on the measured current.

11. The device of claim 1 further comprising a serial port connected to the monitoring circuit to receive data about the appliance.

12. The device of claim 1 further comprising a battery, wherein the monitoring circuit receives power from the first coupler and the battery supplies power to the monitoring circuit when power is not received by the first coupler.

13. The device of claim 2 further comprising a switch connected to the first coupler wherein the switch is opened in response to the control signal to prevent power from the source from being supplied to the appliance.

14. The device of claim 2 further comprising a switch connected to the first coupler to adjust the amount of power received by the appliance in response to the control signal.

15. The device of claim 1 wherein the first coupler comprises a first pin for connection to a live line and a second pin for connection to a neutral line.

16. The device of claim 15 further comprising a first power line and a second power line connecting the first and second couplers, wherein the second coupler includes a first slot connected to the first pin through the first power line and a second slot connected to the second pin through the second power line.

17. A system for monitoring an appliance that receives power from a source, the system comprising:

a power line connected to the source;

a circuit connected to the power line and the appliance to monitor power supplied to the appliance; and a processor connected to the power line, wherein the circuit sends a signal to the processor through the power line and the signal is based on the power supplied to the appliance, and wherein the circuit includes a memory that stores an electronic signature of the appliance and the signal includes the electronic signature.

18. The system of claim 17 wherein the circuit comprises:

a first coupler that couples the circuit to the power line;

a second coupler that couples the circuit to the appliance;

a monitoring circuit connected to the first coupler and the second coupler to monitor power supplied by the source to the appliance; and a communications circuit connected to the monitoring circuit, wherein the monitoring circuit provides data based on the monitored power to the communications circuit for output to the first coupler.

19. The system of claim 18 wherein the circuit comprises a plug and the first coupler comprises a first pin for connection to a live line and a second pin for connection to a neutral line.

20. The system of claim 19 wherein the monitoring circuit further comprises a first power line and a second power line connecting the first and second couplers, and the second coupler comprises a first and second slot, with the first slot connected to the first pin through the first power line and the second slot connected to the second pin through the second power line.

21. The system of claim 17 wherein the processor receives signals transmitted on the power line from the circuit and determines a state of operation of the appliance based on the signals and the electronic signature of the appliance.

22. The system of claim 17 wherein the circuit includes a receiver for receiving signals sent from the processor on the power line.

23. The system of claim 22 wherein the appliance's operating state is controlled based on the signals sent to the circuit from the processor.

24. The system of claim 21 further comprising a connection to a service provider, wherein the processor comprises a control server, that sends signals to the service provider about the operation of the appliance.

25. The system of claim 21 further comprising a connection to a remote service provider, wherein the processor comprises a gateway, that sends signals to the service provider about the operation of the appliance.

26. The system of claim 21 wherein the processor diagnoses the signals to determine if an appliance needs service.

27. The system of claim 26 further comprising a display wherein the processor sends a message to the display alerting a user if the appliance needs service.

28. A device for monitoring an appliance that receives power from a source, the device comprising:

first means for coupling the device to the power basis;

second means for coupling the device to the appliance;

means for monitoring power supplied to the appliance; and means for communicating data based on the monitored power received from the monitoring means, wherein the monitoring means provides the data and an electronic signature of the appliance to the communications means for output to the first coupling means.

29. The device of claim 28 wherein the communications means includes a receiver that receives a signal from the firs,cling means to control the monitoring means.

30. The device of claim 28 wherein the communications means includes a transceiver that receives a signal from the first coupling means to control the monitoring means and to transmit monitored power data.

31. The device of claim 28 wherein the monitoring means measures current drawn by the appliance.

32. The device of claim 28 wherein the monitoring means determines power used by the appliance.

33. The device of claim 28 wherein the monitoring means determines an operating state of the appliance based on the per used by the appliance.

34. The device of claim 28 further comprising a means for switching connected to the first coupler to open in response to the control signal to inhibit power from the source from being supplied to the appliance.

35. A retrofit plug adapted to be received by an appliance that receives power from a source, the retrofit plug comprising:

a live pin;

a neutral pin;

a first line connected to the live pin;

a second line connected to the neutral pin;

a first slot, connected to the first line, for receiving a pin from the appliance;

a second slot, connected to the second line, for receiving a neutral pin from the appliance;

a transformer connected to monitor the first and second lines;

a measurement circuit connected to the transformer for measuring current supplied to the appliance; and a power line carrier transceiver for encoding a power line carrier signal based on the measured current and an electronic signature of the appliance.

* * * * *